US011826622B2

(12) United States Patent
Blevins et al.

(10) Patent No.: US 11,826,622 B2
(45) Date of Patent: Nov. 28, 2023

(54) GOLF CLUB HEAD WITH PERMANENT FACE INDICIA

(71) Applicant: Taylor Made Golf Company, Inc., Carlsbad, CA (US)

(72) Inventors: Scott T. Blevins, Dallas, TX (US); Michael Fox, Dallas, TX (US); Justin Honea, Richardson, TX (US)

(73) Assignee: TAYLOR MADE GOLF COMPANY, INC., Carlsbad, CA (US)

( * ) Notice: Subject to any disclaimer, the term of this patent is extended or adjusted under 35 U.S.C. 154(b) by 0 days.

(21) Appl. No.: 17/531,979

(22) Filed: Nov. 22, 2021

(65) Prior Publication Data

US 2022/0080273 A1 Mar. 17, 2022

Related U.S. Application Data

(63) Continuation of application No. 16/729,983, filed on Dec. 30, 2019, now Pat. No. 11,179,613, which is a
(Continued)

(51) Int. Cl.
*A63B 60/42* (2015.01)
*A63B 53/04* (2015.01)
(Continued)

(52) U.S. Cl.
CPC .............. *A63B 60/42* (2015.10); *A63B 53/04* (2013.01); *A63B 53/047* (2013.01);
(Continued)

(58) Field of Classification Search
CPC ..... A63B 60/42; A63B 53/04; A63B 53/0466; A63B 53/047; A63B 53/0458;
(Continued)

(56) References Cited

U.S. PATENT DOCUMENTS

| 1,402,537 A | 1/1922 | Reach |
| 1,660,126 A | 2/1928 | Heeter |

(Continued)

FOREIGN PATENT DOCUMENTS

| JP | 2001095956 | 4/2001 |
| JP | 2004209021 | 7/2004 |
| JP | 3148964 U | 3/2009 |

OTHER PUBLICATIONS

Globalgolf, "Taylor Made Rossa Corza Ghost Putter Golf Club," downloaded from http://www.globalgolf.com/product/golfclub/-/sku--1017311-aac/putter- /taylor-made/rossa-corza-ghost.aspx?gd=1 &utm.sub.-source=bingshopping&utm.sub.-medium=feed &utm.sub.-term=Taylo- r%20Made-Rossa%20Corza%20Ghost&utm. sub.-campaign=bingshopping, 1 p. (document not dated, downloaded on Feb. 3, 2011).

(Continued)

*Primary Examiner* — Sebastiano Passaniti
(74) *Attorney, Agent, or Firm* — Dawsey Co., LPA; David J. Dawsey

(57) ABSTRACT

A wood-style golf club head having a variable thickness face, a plurality of linear face markings including at least one above and below face center, and face permanent indicia including at least two letters located at least partially on a face toe portion of the face, along with unique relationships to emphasize the contrast of some elements and reduce the contrast of other elements, including a significant contrast between the linear face markings and the face, and a controlled contrast between the face and the face permanent indicia.

20 Claims, 14 Drawing Sheets

Related U.S. Application Data continuation of application No. 15/371,665, filed on Dec. 7, 2016, now Pat. No. 10,518,151, which is a continuation of application No. 14/331,433, filed on Jul. 15, 2014, now Pat. No. 9,533,202.

(60) Provisional application No. 61/846,424, filed on Jul. 15, 2013.

(51) Int. Cl.
*A63B 102/32* (2015.01)
*G06F 16/51* (2019.01)
*A63B 71/06* (2006.01)

(52) U.S. Cl.
CPC ...... *A63B 53/0408* (2020.08); *A63B 53/0466* (2013.01); *G06F 16/51* (2019.01); *A63B 53/0445* (2020.08); *A63B 53/0458* (2020.08); *A63B 2071/0694* (2013.01); *A63B 2102/32* (2015.10)

(58) Field of Classification Search
CPC ........ A63B 53/0445; A63B 2071/0694; A63B 2102/32; A63B 53/0408
USPC .................................................. 473/330–331
See application file for complete search history.

(56) References Cited

U.S. PATENT DOCUMENTS

| | | |
|---|---|---|
| D97,418 S | 11/1935 | Smith |
| 2,463,798 A | 3/1949 | Paisley |
| 2,534,947 A | 12/1950 | Bright |
| 2,842,369 A | 7/1958 | East |
| 2,846,228 A | 8/1958 | Reach |
| 2,865,635 A | 12/1958 | Jessen |
| 2,929,631 A | 3/1960 | Gillon |
| 2,954,231 A | 9/1960 | Macintyre |
| 3,468,545 A | 9/1969 | Anderson |
| D220,274 S | 3/1971 | Rango |
| 3,708,172 A | 1/1973 | Rango |
| 3,749,408 A | 7/1973 | Mills |
| D231,624 S | 5/1974 | Wilmoth |
| 3,909,005 A | 9/1975 | Piszel |
| D237,289 S | 10/1975 | Calton |
| 3,954,265 A | 5/1976 | Taylor |
| D245,442 S | 8/1977 | Becker |
| 4,077,632 A | 3/1978 | Taylor |
| 4,222,567 A | 9/1980 | Shabala |
| D268,691 S | 4/1983 | Collins |
| 4,753,440 A | 6/1988 | Chorne |
| 4,960,279 A | 10/1990 | Harris, Jr. |
| 4,962,931 A | 10/1990 | Jazdzyk, Jr. |
| 5,100,144 A | 3/1992 | Okumoto et al. |
| 5,190,289 A | 3/1993 | Nagai et al. |
| 5,228,695 A | 7/1993 | Meyer |
| 5,242,344 A | 9/1993 | Hundley |
| D352,758 S | 11/1994 | Tate |
| 5,460,377 A | 10/1995 | Schmidt et al. |
| 5,470,072 A | 11/1995 | Cunningham |
| 5,529,299 A | 6/1996 | Bellagamba |
| D378,392 S | 3/1997 | Shumway |
| D378,844 S | 4/1997 | Shine |
| D380,030 S | 6/1997 | Altman |
| D384,120 S | 9/1997 | De La Cruz et al. |
| 5,676,603 A | 10/1997 | Miller |
| D388,853 S | 1/1998 | Minami |
| D389,885 S | 1/1998 | Mahaffey et al. |
| 5,720,668 A | 2/1998 | Brett |
| 5,769,740 A | 6/1998 | Colangelo |
| 5,800,285 A | 9/1998 | Thorne et al. |
| D402,724 S | 12/1998 | Minami |
| 5,851,335 A | 12/1998 | Budnik et al. |
| 5,880,430 A | 3/1999 | Wein |
| 6,007,432 A * | 12/1999 | Kosmatka ............ A63B 53/04 473/324 |
| 6,024,650 A | 2/2000 | Reeves |
| D422,664 S | 4/2000 | Tate |
| D424,145 S | 5/2000 | Minami |
| 6,149,531 A | 11/2000 | Hooker |
| 6,224,494 B1 | 5/2001 | Patsky |
| 6,327,921 B1 | 12/2001 | Hsu et al. |
| D453,365 S | 2/2002 | Carr et al. |
| 6,348,010 B1 | 2/2002 | Doolen |
| 6,368,234 B1 | 4/2002 | Galloway |
| 6,381,828 B1 | 5/2002 | Boyce et al. |
| 6,425,831 B1 | 7/2002 | Heene et al. |
| D461,513 S | 8/2002 | Madore et al. |
| D461,862 S | 8/2002 | Madore et al. |
| 6,471,600 B2 | 10/2002 | Tang et al. |
| D466,173 S | 11/2002 | Sizemore, Jr. |
| 6,506,125 B2 | 1/2003 | Helmstetter et al. |
| D478,948 S | 8/2003 | Bergling-Olson |
| D485,880 S | 1/2004 | Madore et al. |
| 6,676,535 B2 | 1/2004 | Sheets et al. |
| 6,710,287 B2 | 3/2004 | Lu |
| 6,713,717 B2 | 3/2004 | Takeda |
| 6,719,644 B2 | 4/2004 | Beach |
| D490,487 S | 5/2004 | Burrows |
| 6,729,972 B2 | 5/2004 | Boord |
| D503,762 S | 4/2005 | Wood |
| D518,864 S | 4/2006 | Bradshaw |
| 7,022,030 B2 | 4/2006 | Best et al. |
| D527,064 S | 8/2006 | Breier et al. |
| 7,140,975 B2 * | 11/2006 | Bissonnette ....... A63B 53/0466 473/345 |
| 7,172,519 B2 | 2/2007 | Byrne et al. |
| D537,895 S | 3/2007 | Breier et al. |
| 7,235,021 B2 | 6/2007 | Solheim et al. |
| 7,264,558 B2 | 9/2007 | Kubica et al. |
| D553,210 S | 10/2007 | Harvell et al. |
| D553,211 S | 10/2007 | Harvell et al. |
| 7,278,928 B2 | 10/2007 | Newman et al. |
| 7,344,451 B2 | 3/2008 | Tang et al. |
| D568,427 S | 5/2008 | Nguyen et al. |
| D572,325 S | 7/2008 | Baer |
| 7,396,289 B2 | 7/2008 | Soracco et al. |
| D577,405 S | 9/2008 | Oldknow et al. |
| D583,431 S | 12/2008 | Madore et al. |
| 7,481,715 B2 | 1/2009 | Byrne |
| 7,491,135 B1 | 2/2009 | Rollinson |
| D591,812 S | 5/2009 | Breier et al. |
| D596,691 S | 7/2009 | Heap |
| 7,559,852 B2 | 7/2009 | Werner et al. |
| 7,576,298 B2 | 8/2009 | Erb et al. |
| 7,588,499 B2 | 9/2009 | Tateno |
| D607,952 S | 1/2010 | Demkowski et al. |
| 7,662,049 B2 | 2/2010 | Park et al. |
| D618,294 S | 6/2010 | Morris et al. |
| D631,928 S | 2/2011 | Piatkowski |
| 7,909,708 B2 | 3/2011 | Gilbert |
| 7,985,146 B2 | 7/2011 | Lin et al. |
| D643,890 S | 8/2011 | Piniarski et al. |
| D643,891 S | 8/2011 | Piniarski et al. |
| D643,894 S | 8/2011 | Price et al. |
| D643,899 S | 8/2011 | Piniarski et al. |
| 8,021,245 B2 | 9/2011 | Beach |
| 8,025,589 B2 | 9/2011 | Brinton et al. |
| 8,033,931 B2 | 10/2011 | Wahl et al. |
| 8,056,206 B2 | 11/2011 | Jones et al. |
| 8,128,510 B2 | 3/2012 | Gilbert |
| 8,157,668 B2 | 4/2012 | Wahl et al. |
| 8,206,240 B2 * | 6/2012 | Park ..................... A63B 53/047 473/331 |
| 8,262,504 B2 | 9/2012 | Liu et al. |
| 8,376,877 B1 | 2/2013 | Galloway |
| 8,414,424 B2 | 4/2013 | Hebert et al. |
| 8,740,719 B2 * | 6/2014 | Wahl ..................... A63B 60/00 473/331 |
| 8,771,095 B2 | 7/2014 | Beach et al. |
| 9,533,202 B2 * | 1/2017 | Blevins ................. A63B 53/08 |
| 9,764,204 B2 * | 9/2017 | Beach ................ A63B 53/0466 |
| 10,518,151 B2 * | 12/2019 | Blevins .............. A63B 53/0466 |

(56) References Cited

U.S. PATENT DOCUMENTS

| | | | |
|---|---|---|---|
| 11,179,613 B2* | 11/2021 | Blevins | A63B 60/42 |
| 11,504,588 B2* | 11/2022 | Barker | A63B 53/047 |
| 2002/0166363 A1 | 11/2002 | Pringle | |
| 2003/0008722 A1 | 1/2003 | Konow | |
| 2003/0017885 A1 | 1/2003 | Heene et al. | |
| 2003/0060306 A1 | 3/2003 | Aldrich | |
| 2003/0220157 A1 | 11/2003 | Dennis et al. | |
| 2004/0003638 A1 | 1/2004 | Schaefer et al. | |
| 2004/0221639 A1 | 11/2004 | Woo et al. | |
| 2005/0037854 A1 | 2/2005 | Green | |
| 2005/0130755 A1 | 6/2005 | Lindsay | |
| 2005/0164800 A1 | 7/2005 | Wood et al. | |
| 2005/0181310 A1 | 8/2005 | Yang et al. | |
| 2005/0272522 A1 | 12/2005 | Chen et al. | |
| 2006/0235564 A1 | 10/2006 | Troitski | |
| 2008/0051212 A1 | 2/2008 | Voges | |
| 2008/0076593 A1 | 3/2008 | Costa et al. | |
| 2008/0076598 A1 | 3/2008 | Lin | |
| 2009/0017933 A1 | 1/2009 | Stites et al. | |
| 2009/0017934 A1 | 1/2009 | Stites et al. | |
| 2009/0215547 A1 | 8/2009 | Hegarty | |
| 2009/0233731 A1 | 9/2009 | Hsu et al. | |
| 2009/0314398 A1 | 12/2009 | Shaar, Jr. | |
| 2009/0326688 A1 | 12/2009 | Thomas et al. | |
| 2010/0267467 A1 | 10/2010 | Stites et al. | |
| 2011/0034270 A1 | 2/2011 | Wahl et al. | |
| 2011/0059808 A1 | 3/2011 | Roach et al. | |
| 2011/0111885 A1 | 5/2011 | Golden et al. | |
| 2011/0264499 A1 | 10/2011 | Abendroth et al. | |
| 2011/0306439 A1 | 12/2011 | Lin et al. | |
| 2012/0083354 A1 | 4/2012 | Bertone et al. | |
| 2012/0094782 A1 | 4/2012 | Beach et al. | |
| 2012/0100929 A1 | 4/2012 | Kuan et al. | |
| 2012/0264537 A1 | 10/2012 | Breier et al. | |
| 2013/0053169 A1* | 2/2013 | Dumas | A63B 53/0487 473/324 |
| 2013/0085009 A1 | 4/2013 | Thomas et al. | |
| 2013/0123040 A1 | 5/2013 | Willett et al. | |
| 2015/0038249 A1 | 2/2015 | Takao et al. | |
| 2019/0143182 A1* | 5/2019 | Knuth | A63B 1/00 473/342 |

OTHER PUBLICATIONS

Tour Stop, "TaylorMade Putter Daytona #1 Ghost Right Hand," http://www.tourstop.com/istar.asp?a=6&id=DAYTONAGHOST1RH%2116432&utm.sub.---source=VersaFeed&utm.sub.-medium=VersaFeed.sub.--bing&utm.sub.-content-=TaylorMade+Putter+Daytona+1+Ghost+Right+Hand+White+35.sub.-inches&utm.su- b.-campaign=cashback&v.sub.-traceback=c0118.sub.-2321.sub.--f0128.sub.---1833, 1p. (document not dated, downloaded on Feb. 3, 2011).

Cobragolf, "Limited Edition ZL Driver," http://www.cobragolf.com/golf-clubs/Cobra-White-ZL-Driver, 3pp. (document not dated, downloaded on Feb. 3, 2011).

About.com Golf, "Cobra Offers All-White ZL Driver—But Only 500 of Them," http://golf.about.com/b/2010/11/05/cobra-offers-all-white-z1-driver-but-o- nly-500-of-them.htm, 1p. (document marked Nov. 5, 2010, downloaded on Feb. 3, 2011).

Golf Digest, "How to Play Fearless Golf," http://golfdigest.com (Mar. 2011).

"Procedure for Measuring the Flexibility of a Golf Clubhead USGA-TPX3004", May 1, 2008, from USGA, <https://www.usga.org/content/dam/usga/pdf/Equipment/TPX3004-procedure-for-measuring-the-flexibility-of-a-golf-clubhead.pdf>.

\* cited by examiner

GOLF CLUB HEAD WITH PERMANENT FACE INDICIA

CROSS-REFERENCE TO RELATED APPLICATIONS

This application is a continuation of U.S. nonprovisional application Ser. No. 16/729,983, filed on Dec. 30, 2019, which is a continuation of U.S. nonprovisional application Ser. No. 15/371,665, filed on Dec. 7, 2016, now U.S. Pat. No. 10,518,151, which is a continuation of U.S. nonprovisional application Ser. No. 14/331,433, filed on Jul. 15, 2014, now U.S. Pat. No. 9,533,202, which claims the benefit of U.S. provisional patent application Ser. No. 61/846,424, filed on Jul. 15, 2013, all of which are incorporated by reference as if completely written herein.

STATEMENT REGARDING FEDERALLY SPONSORED RESEARCH OR DEVELOPMENT

This invention was not made as part of a federally sponsored research or development project.

TECHNICAL FIELD

The present invention relates to sports equipment; particularly, to a golf club head having permanent performance indicating indicia on the face, a face template containing performance indicating indicia, an electronic face template containing performance indicating indicia that is unique for each golf club head, and/or a method of selling golf clubs based on a performance characteristic of the golf club head.

BACKGROUND OF THE INVENTION

In 1998 the United States Golf Association (USGA) limited the coefficient of restitution (COR) in drivers to 0.830, more specifically to 0.822 with a test tolerance of 0.008 effectively taking the limit up to 0.830. With the introduction of these limits, The USGA needed a test procedure to measure a driver's COR. Originally, a ball was fired by air cannon into a specimen and pre and post impact velocities were compared to find COR, as set forth in "Procedure for Measuring the Velocity Ratio of a Clubhead for Conformance to Appendix II, (5a.)," Revision 3 Jan. 1, 2002. This process took a significant amount of time to perform when considering the set up and the controls associated with the test.

Those skilled in the art know that today the characteristic time, often referred to as the CT, value of a golf club head is more widely used in determining conformance with the USGA equipment rules. The rules currently state that the characteristic time, or CT, of a club head shall not be greater than 239 microseconds, with a maximum test tolerance of 18 microseconds. Thus, it is common for golf clubs to be designed with the goal of a 239 microsecond CT, knowing that due to manufacturing variability that some of the heads will have a CT value higher than 239 microseconds, and some will be lower. However, it is critical that the CT value does not exceed 257 microseconds or the club will not conform to the USGA rules. The USGA publication "Procedure for Measuring the Flexibility of a Golf Clubhead," Revision 2.0, Mar. 25, 2005, is the current standard that sets forth the procedure for measuring the characteristic time. However, this CT test is only applicable to drivers and the USGA still employs the air cannon COR test when testing fairway woods, hybrids and irons.

Another common golf club performance variable is the smash factor, or SF. The smash factor is defined as the ratio of ball speed to club head speed and may be used as a measure of the quality of ball striking. First, one must look to the ball speed formula, specifically:

$$V\text{ball} = V\text{ch} * [(1+\text{COR})/(1+(M\text{ball})/(M\text{ch}))] * \cos(\text{loft}) * (1-0.14*\text{miss})$$

where:
Vball is the velocity of the ball immediately after impact with the club head.
Vch is the velocity at of the club head at impact with the golf ball.
Mball is the mass of the golf ball, most commonly approximately 46 grams.
Mch is the mass of the club head in grams.
"miss" is the distance, in inches, that impact misses the face center.
COR is the coefficient of restitution measured at the face center.

Since the smash factor (SF) is the ratio of the ball speed to the club head speed, the equation for smash factor (SF) is:

$$SF = (V\text{ball}/V\text{ch}) = [(1+\text{COR})/(1+(M\text{ball})/(M\text{ch}))] * \cos(\text{loft}) * (1-0.14*\text{miss})$$

Thus, the potential smash factor (SF) at any point on the face can be determined and is very club head specific since it takes into account the particular golf club head's COR, mass, and loft.

Currently, most golf club heads that are sold to the general golfing population are not individually tested to determine each golf club head's CT, or COR, or potential SF value(s). Generally, a random sample will be taken off the manufacturing line and tested to determine conformance of a much larger lot of heads. Thus, it is not uncommon for golf club heads having nonconforming CT, or COR, values to make it to the market. In fact, in the past decade at least two major golf equipment companies have issued recalls on their products because heads with higher than allowable CT value have made it into the hands of golfers. Such product recalls are incredibly expensive and result in tremendous waste, not to mention the impact upon consumer confidence.

Numerous production variables influence the final COR and CT values of a golf club head, as well as the potential SF values. Today, most driver heads are composed of several individual components joined together to create a golf club head. Often times the golf club's sole, crown, and face are distinct components, often made of dissimilar materials and/or thicknesses, which are joined together to create the final product. Generally the metallic components are welded or brazed together, and the non-metallic components are joined to metallic components by adhesives. One skilled in the art will appreciate that manufacturing variables such as the quality of a weld, the amount of brazing material, and adhesive quality and curing, just to name a few, can influence the final performance of a golf club head, including the COR, CT, and potential SF values. Further, variability in the composition of the alloys used to form the various components may influence the performance variables, as can unintended variations from the design thickness of the components introduced during casting or forging. Because of these factors, one golf club head design that is produced at two different manufacturing facilities may have significantly different COR and CT values. Thus, the real COR and/or SF and/or CT value of a golf club head cannot be accurately determined until the head is fully assembled in its final form.

A consumer purchasing a golf club often has no idea if the particular golf club head they are purchasing has a CT value or COR value within the USGA limit, above the limit, or well below the limit. Utilizing a club head with a value above the limit during tournament play could result in the disqualification of a golfer; whereas using a club head with a value below the limit means that the golfer is possibly handicapping themselves with respect to the rest of the field. Additionally, the purchaser generally has no idea how the CT, COR, and/or potential SF values vary at particular locations across the face of the golf club head. Therefore, the need exists for a method of identifying and marking the CT, COR, or potential SF value on the face of a golf club head, either permanently or via a removable face template.

SUMMARY OF THE INVENTION

A method of identifying and marking a measured performance variable, such as the CT value, COR value, potential smash factor, etc., of at least one location on the face of a golf club head, either permanently or via a removable face template, thereby enabling a significant advance in the state of the art; a golf club head having performance indicating indicia on the face; a method for creating same; and a method of selling golf clubs based upon a measured performance variable.

BRIEF DESCRIPTION OF THE DRAWINGS

Without limiting the scope of the present invention as claimed below and referring now to the drawings and figures:

Figure 1:
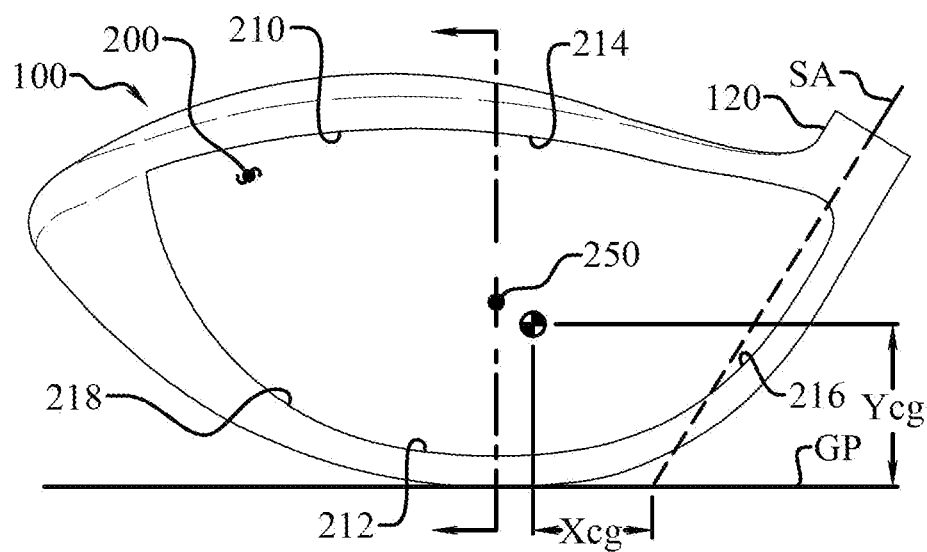
FIG. 1 shows a front elevation view of a golf club head of the present invention, not to scale.

These drawings are provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The present method of identifying and marking a measured performance variable, such as the CT value, COR value, potential smash factor, etc., of at least one location on the face of a golf club head, either permanently or via a removable face template, thereby enabling a significant advance in the state of the art; a golf club head having performance indicating indicia on the face; a method for creating same; and a method of selling golf clubs based upon a measured performance variable. The preferred embodiments of the invention accomplish this by new and novel arrangements of elements and methods that are configured in unique and novel ways and which demonstrate previously unavailable but preferred and desirable capabilities. The description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

The present invention includes a golf club head with permanent performance indicating indicia on the face and a method of making the golf club head. As explained in the "Background of the Invention" section above, despite all the technical advances in the field of golf equipment, it is difficult, if not impossible, to predict the true final characteristic time, often referred to as the CT, or the final coefficient of restitution, often referred to as the COR, of a golf club head via computer modeling. The fact is that too many production and manufacturing variables influence the final CT and/or COR of an assembled golf club head.

FIG. 1 illustrates a golf club head (100) having a face (200) and a face center (250). One skilled in the art will recognize that the face center (250), as used herein, may be located using the USGA method described in the United States Golf Association publication, "Procedure for Measuring the Flexibility of a Golf Club head," Revision 2.0, Section 6.1 (Mar. 25, 2005). As described in this procedure the face center (250), maybe located using a template, having a coordinate system with a heel-toe axis orthogonal to a sole-crown axis. An aperture may be located at the origin of the coordinate system and each axis may be divided into evenly spaced increments. The template may be composed of a flexible material, e.g., a transparent polymer. The template is used as follows: 1) The template is placed on the face (200) with the heel-toe axis substantially parallel to the leading edge. The template is then moved back and forth in the heel-toe direction along the face (200) until the heel and toe measurements at the opposite edges of the face (200) are equal. 2) The template is moved back and forth in the sole-crown direction along the face (200) until the sole and crown measurements at the opposite edges of the face (200) are equal. 3) The template is moved with respect to the face (200) as described in steps 1 and 2, above, until the heel and toe as well as the sole and crown measurements along the corresponding axes are equal. A point is then marked on the face (200) through the aperture to indicate the face center (250). The same USGA publication identifies the procedure for determining the characteristic time at the face center (250), referred to herein as the center face CT. The same procedure may be used to determine the characteristic time, or CT, of any point on the face (200) of the golf club head (100) after it is fully assembled, finished, and ready for use.

Figure 2:
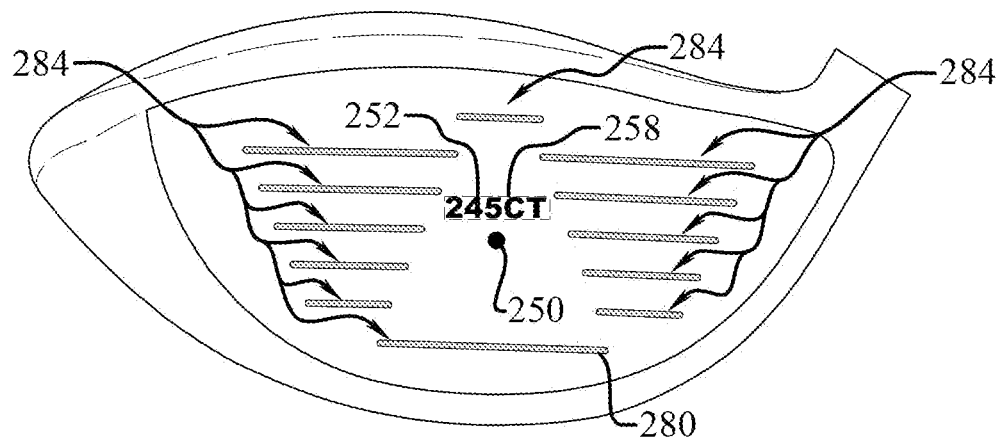
FIG. 2 shows a front elevation view of a golf club head of the present invention, not to scale.
Figure 19:
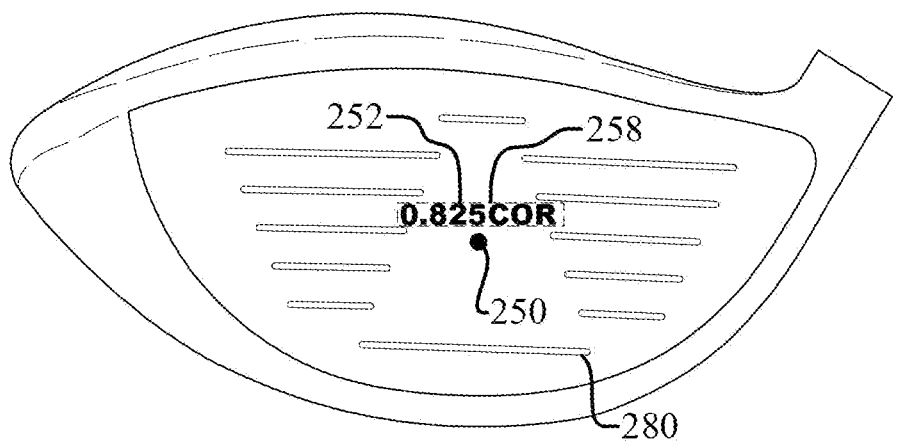
FIG. 19 shows a front elevation view of a golf club head of the present invention, not to scale.

FIG. 2 illustrates a golf club head (100) with the center face (250) identified and having a center face permanent indicia (252) with a center face indicia surface area (258), wherein the center face permanent indicia (252) is indicative of the measured center face CT that may be unique to each individual golf club head (100). Similarly, the embodiment of FIG. 19 illustrates a golf club head (100) with the center face (250) identified and having a center face permanent indicia (252) with a center face indicia surface area (258), wherein the center face permanent indicia (252) is indicative of the measured center face COR that may be unique to each golf club head (100). Further, in yet another embodiment, not illustrated but easily understood, the golf club head (100) has a center face permanent indicia (252) that is indicative of the potential smash factor (SF), which takes into account the measured center face COR, the measured mass of the golf club head (100), and the measured loft. This embodiment is particularly relevant to a particular golf club head (100) because although there is a "design" club head mass and loft, the actual club head mass and loft of the finished golf club head (100) is rarely equal to the design values. Thus, in a variation of this embodiment separate measured club head mass permanent indicia and measured loft permanent indicia may also be on the golf club head (100), although not necessarily on the face (200).

Figure 3:
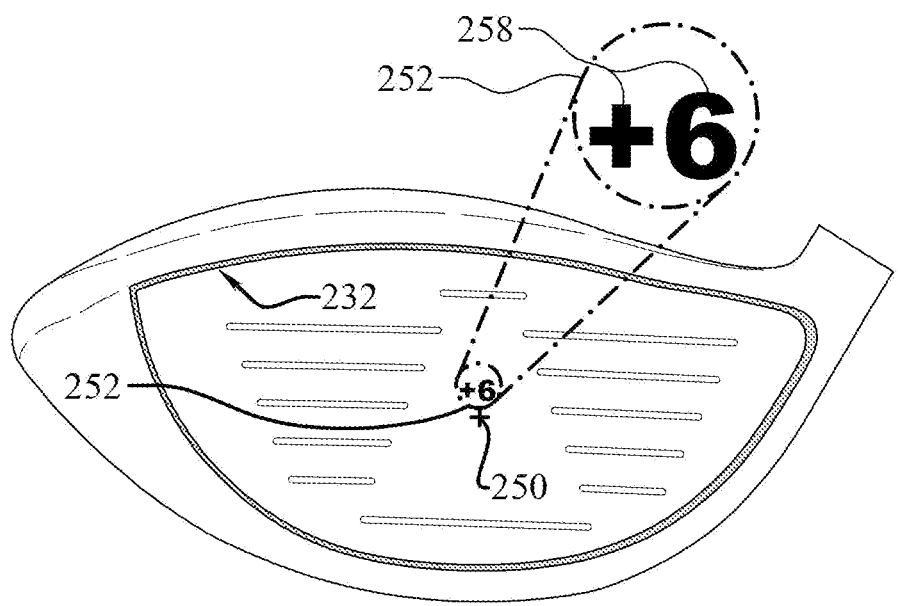
FIG. 3 shows a front elevation view of a golf club head of the present invention, not to scale.

The center face permanent indicia (252) can include numerals, letters, symbols, and/or changes in, or on, the surface of the face (200) that are indicative of the measured center face CT. In the embodiment of FIG. 2 the measured center face CT was 245 microseconds and the center face permanent indicia (252) consists of the marking "245 CT," or simply "245," which allows the purchaser to know the exact CT of the club head (100) that they are purchasing and the point on the face (200) at which it was measured. An alternative center face permanent indicia (252) that is indicative of the measured center face CT is shown in FIG. 3 consisting of the marking "+6," showing the consumer that the center face CT is 6 microseconds above the USGA limit of 239 microseconds, but still within the maximum test tolerance of 18 microseconds. Thus, in this example a threshold CT value is the 239 microsecond value and the center face permanent indicia (252) is identifying the difference between the measured center face CT and the threshold value. One skilled in the art will appreciate that the threshold value is not limited to the 239 microsecond value, but may be any preset value that allows a consumer to then determine the center face CT that was actually measured for a particular golf club head (100).

An even further alternative embodiment may incorporate center face permanent indicia (252) that is indicative of the measured center face CT that consists of the marking "−12," indicating to the consumer that the center face CT is 12 microseconds below the USGA limit of 239 microseconds plus the 18 microsecond tolerance. Yet another embodiment may simply incorporate center face permanent indicia (252) that is indicative of the measured center face CT that consists of a marking such as "MAX" if the measured center face CT is at, or above, 239 microseconds; or even further such a "MAX" marking may be reserved for if the measure center face CT is at the absolute 257 microsecond limit. In the embodiments utilizing letters, numbers, and/or symbols as the center face permanent indicia, the center face indicia surface area is defined by area on the face (200) enclosed by the smallest imaginary rectangular box drawn on the face (200) that totally encloses the center face permanent indicia (252), as seen in FIG. 2.

Figure 20:
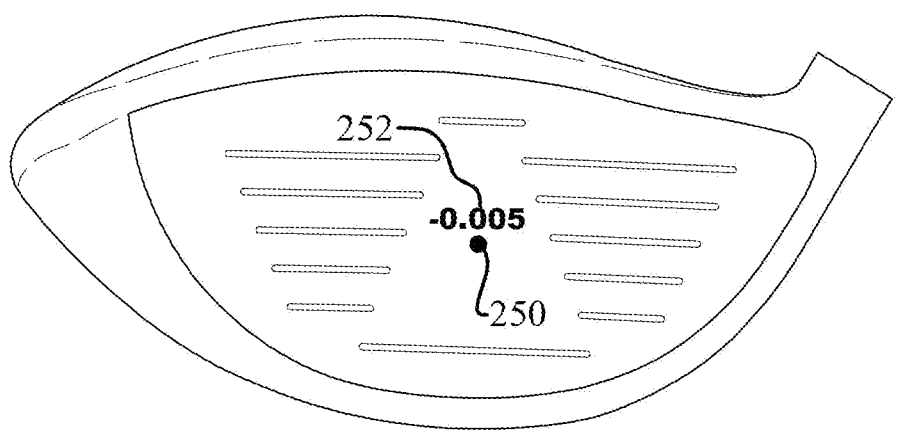
FIG. 20 shows a front elevation view of a golf club head of the present invention, not to scale.
Figure 21:
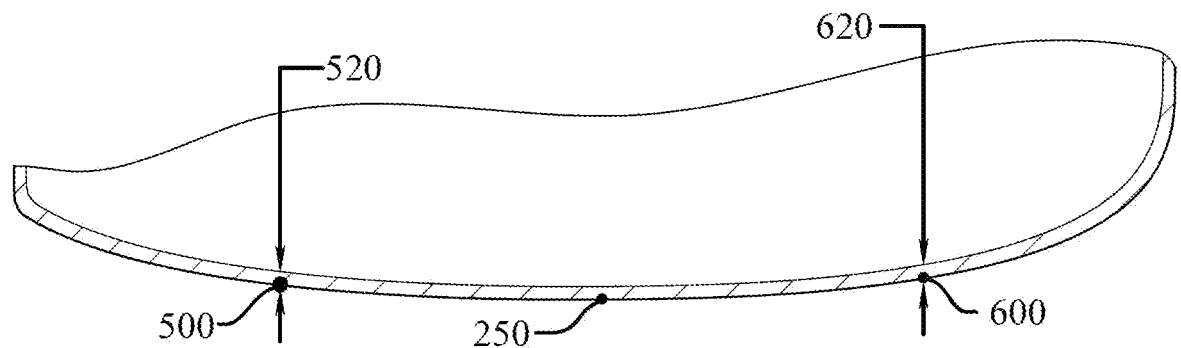
FIG. 21 shows a partial cross-sectional view of a golf club head of the present invention, taken along section lines 21-21 in FIG. 16, not to scale.
Figure 22:
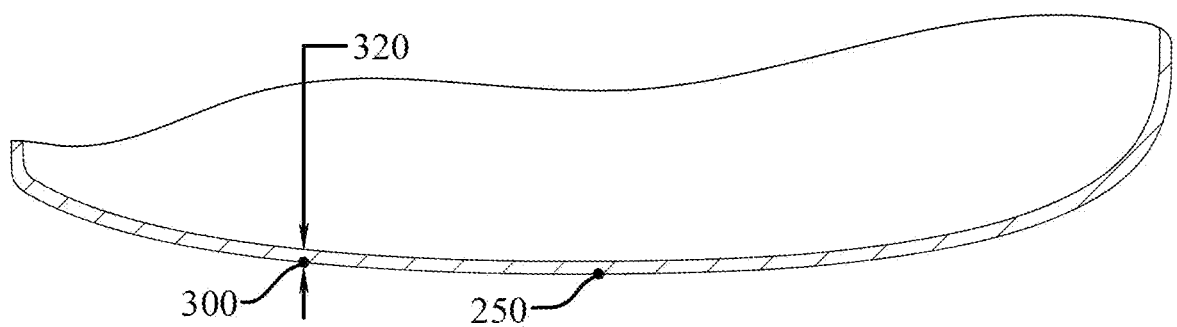
FIG. 22 shows a partial cross-sectional view of a golf club head of the present invention, taken along section lines 22-22 in FIG. 16, not to scale.
Figure 23:
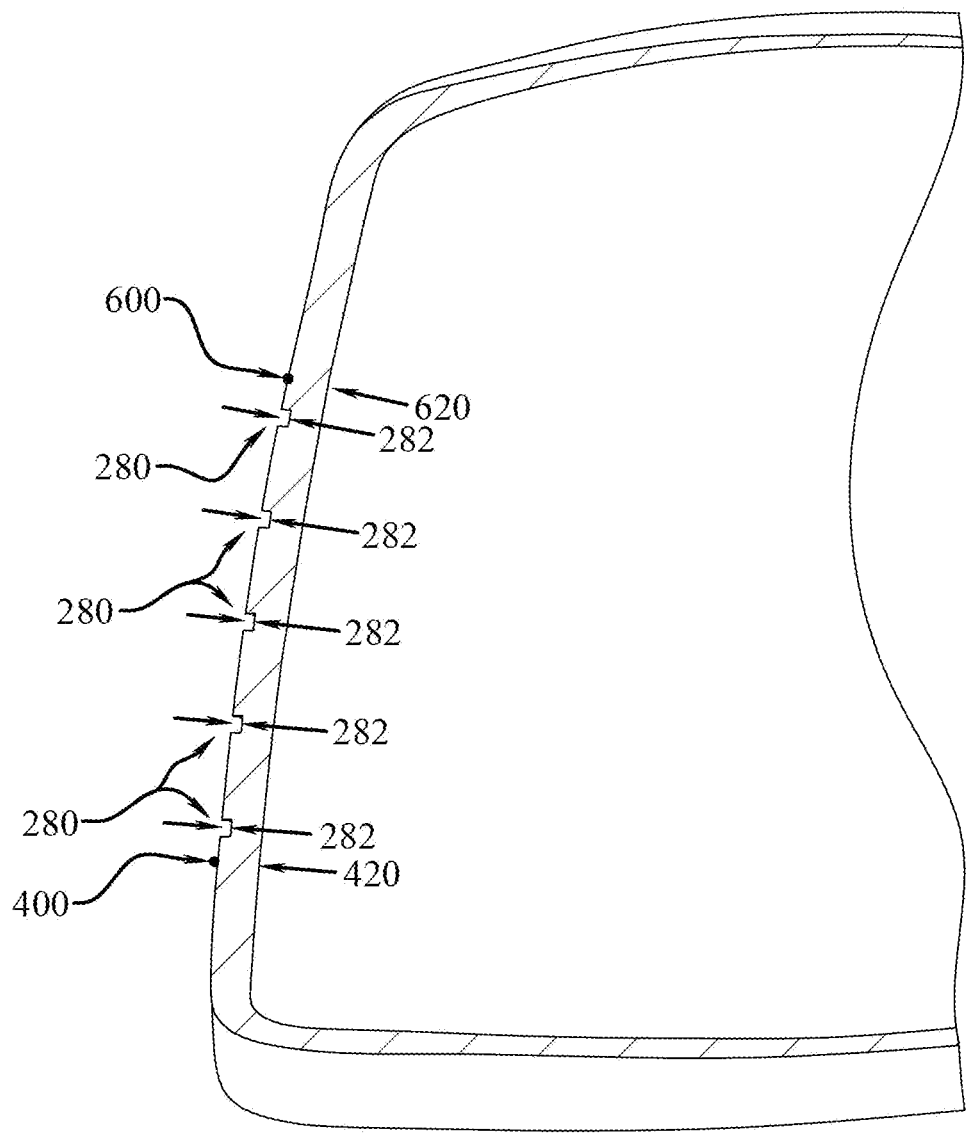
FIG. 23 shows a partial cross-sectional view of a golf club head of the present invention, taken along section lines 23-23 in FIG. 16, not to scale.

Likewise, in the embodiment of FIG. 19 the measured center face COR was 0.825 and the center face permanent indicia (252) consists of the marking "0.825 COR," or simply "0.825," which allows the purchaser to know the exact COR of the club head (100) that they are purchasing and the point on the face (200) at which it was measured. An alternative center face permanent indicia (252) that is indicative of the measured center face COR is shown in FIG. 20 consisting of the marking "−0.005," showing the consumer that the center face COR is 0.005 units below the USGA limit of 0.830. Alternatively the center face permanent indicia (252) may consist of the marking "+0.003," showing the consumer that the center face COR is 0.003 units above the USGA limit of 0.822, but still within the maximum test tolerance of 0.008. Further, any of these COR embodiments may multiply by a factor of 10 to simply the center face permanent indicia (252). For example, multiplying by 1000 would facilitate the use of a "825" marking, or a "−5" marking, or a "+3" marking.

Further, the golf club head (100) may have center face permanent indicia (252) that is indicative of the potential smash factor (SF), thereby taking into account the measured center face COR, the measured mass of the golf club head (100), and the measured loft. As previously explained, the small factor (SF) may be calculated by:

$$SF=(V\text{ball}/V\text{ch})=[(1+COR)/(1+(M\text{ball})/(M\text{ch}))]*\cos(\text{loft})*(1-0.14*\text{miss})$$

For example, taking an ideal impact with a "miss" value of zero, a COR of 0.830, a golf club head (100) mass of 200 grams, and a loft of 10 degrees, the potential smash factor (SF) at the center face is:

$$SF=[(1+0.830)/(1+(46)/(200))]*\cos(10)*(1-0.14*0)=1.465$$

The potential smash factor (SF) for a specific individual golf club head is valuable to a consumer because the use of launch monitors is becoming increasingly common and such launch monitors generally determine the actual smash factor for a particular impact. Therefore, without knowing the potential smash factor (SF) of the golf club head that a golfer is using during testing with a launch monitor, thereby taking into account the specific measured club head COR, mass, and loft, the golfer really has no idea of how close they are to achieving an ideal impact. For instance, in the example above the potential small factor (SF) is 1.465; if a golfer is blindly receiving a reading from a launch monitor of an actual impact's smash factor of 1.4 the golfer may mistakenly believe that an ideal smash factor should be over 1.5, which is a value that is actually not obtainable with this particular golf club head.

Further, in this one example the center face permanent indicia (252) may be a numerical marking of 1.465. The small factor (SF) is a useful tool in that smash factor values may be calculated for multiple locations on the face (200) once the center face COR is measured. For instance, in this example a point 0.75 inches from the face center (250) would have a small factor (SF) of:

$$SF=[(1+0.830)/(1+(46)/(200))]*\cos(10)*(1-0.14*0.75)=1.311$$

Further embodiments of the center face permanent indicia (252) may not include any numerals or letters, but may consist entirely of symbols that are indicative of the measured center face CT. In yet a further embodiment the center face permanent indicia (252) may be a perimeter contour line indicating the area of the face (200) that has a prescribed measured CT value, COR value, or potential smash factor (SF) value. In this embodiment the center face permanent indicia (252) is similar to the highest elevation of a topographic map with contour lines. Alternative embodiments may include additional permanent indicia in the form of contour lines to allow a consumer to view how the measured CT, COR, or potential SF varies across the face (200) of a particular golf club. Such additional permanent indicia contour lines may be shown in increments of 1 microsecond, 2 microseconds, 5 microseconds, or even 10 microseconds. Alternatively, such additional permanent indicia contour lines may be shown in increments of 0.005 COR, 0.01 COR, 0.02 COR, or even 0.05 COR. Alternatively, such additional permanent indicia contour lines may be shown in increments potential smash factor such as 0.005, 0.01, 0.02, or even 0.05. In such a contour line embodiment the permanent indicia surface area is not determined using the rectangular box technique previously identified; rather it is the actual surface area of the perimeter contour line. For example, if the contour line is 1 mm wide and has a length of 25 mm then the permanent indicia surface area is simply 25 mm$^2$, not the area enclosed by the contour line.

Alternatively, in yet a further embodiment the center face permanent indicia (252) may consist of variations of the face surface in lieu of a distinct a perimeter contour line, as described above, while transmitting the same information to the consumer regarding the actual measured performance characteristic of a particular golf club head (100), whether it be CT, or CT profile, COR, or COR profile, or SF, or SF profile. Such permanent indicia surface variations may be achieved with a change in surface texture, brushing, polishing, gloss, and/or color.

The reference used throughout to "permanent indicia" is specifically defined as indicia that is still recognizable, after 500 impacts with a golf ball traveling at 100 miles per hour targeted at the geometric center of the indicia, by a majority of a pool of 100 test subjects with 20/20 vision, when viewed at a distance of 24 inches from their eyes.

The center face permanent indicia (252) need not include a change in the surface elevation of the face (200). However, some embodiments the golf club head (100) have at least a portion of the face (200) covered with a face coating (290) having a coating thickness (292). In such embodiments the center face permanent indicia (252) may be formed in the face coating (290). The face coating (290) may be applied to the golf club head (100) through any number of processes including, but not limited to, physical vapor deposition (PVD) and chemical vapor deposition (CVD). In one embodiment the coating thickness (292) is 0.3-15 microns.

Figure 4:
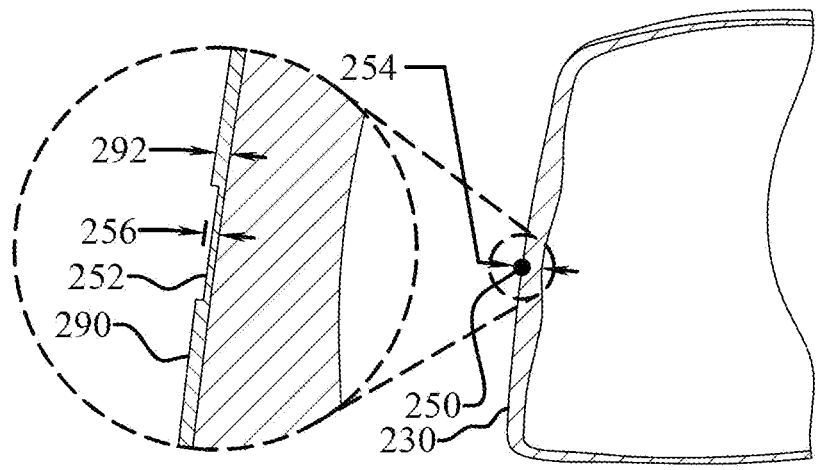
FIG. 4 shows a center face vertical cross-sectional view of a golf club head of the present invention, not to scale.
Figure 6:
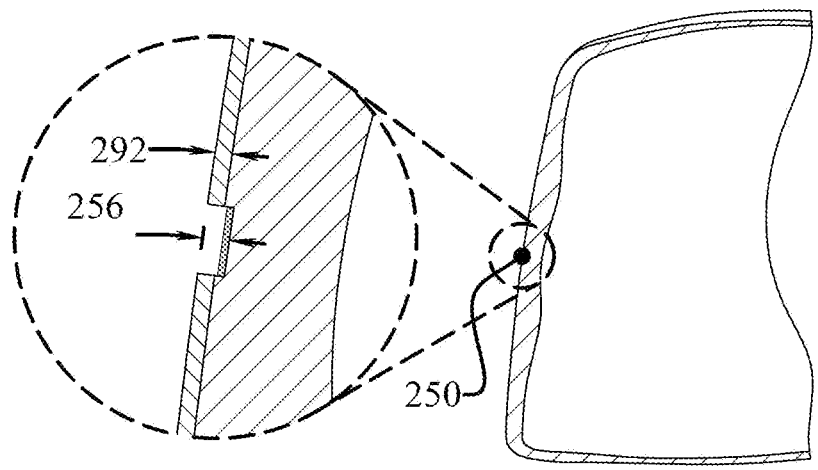
FIG. 6 shows a center face vertical cross-sectional view of a golf club head of the present invention, not to scale.

The center face permanent indicia (252) may have a center face indicia depth (256) that is less than the coating thickness (292) as seen in FIG. 4, less than 50% of the coating thickness (292) in some embodiments, and between 5-50% of the coating thickness (292) in a further embodiment. Conversely, in other embodiments the center face indicia depth (256) may be greater than the coating thickness (292) as seen in FIG. 6, thereby exposing a portion of the parent face material, which in some embodiments may then be covered with a paint-fill process. The paint, ink, and/or coating used for any of the permanent indicia, whether on the surface or recessed, may be a color changing paint in which the color of the material changes with the angle of observance. Thus, in one embodiment when viewed from the address position, the color is low contrast with respect to the face (200), while when viewing the golf club head (100) face-on the color is medium to high contrast with respect to the face. In this embodiment, when viewed from the butt of the golf grip the difference between the center face permanent indicia L* value and the face L* value is less than 25; however when viewing the face (200) perpendicular to the line of sight the difference between the center face permanent indicia L* value and the face L* value is at least 30. In further embodiments the paint, ink, and/or coating used for any of the permanent indicia, whether on the surface or recessed, may be indiscernible to naked eye in certain conditions while easily discernable to the naked eye in other conditions, including, but not limited to, paints, inks, coatings, and/or adhesives that are only visible under the ultra-violet light. Further, the paint, ink, and/or coating used for any of the permanent indicia, whether on the surface or recessed, may be include hydrophilic and/or hydrophobic attributes. Accordingly, certain areas of the face may have a higher level of hydrophilicity than the level of hydrophilicity of other areas of the face. Hydrophilic means attracting water and hydrophobic means repelling water. Thus, the permanent indicia may be indiscernible when the face is dry but when the face brushed with a wet towel the water may be attracted to the permanent indicia such that a golfer can easily identify the permanent indicia.

Figure 5:
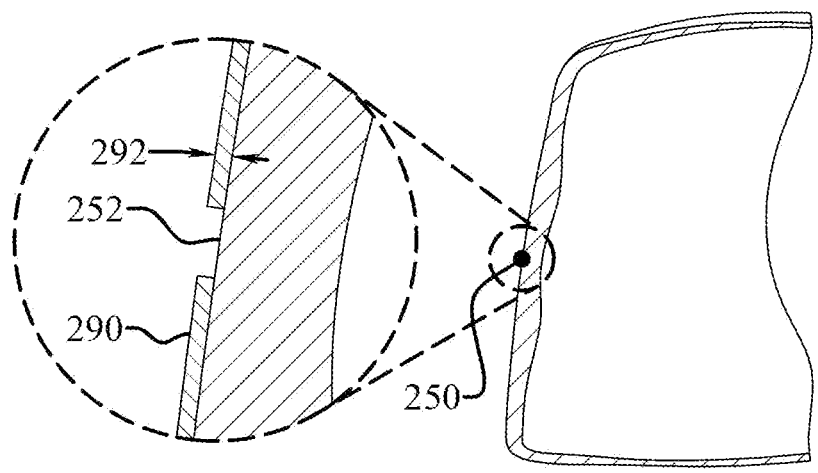
FIG. 5 shows a center face vertical cross-sectional view of a golf club head of the present invention, not to scale.

Further, as seen in FIG. 5, the center face indicia depth (256) may be carefully controlled so that it is approximately equal to the coating thickness (292). The center face indicia depth (256) is important to ensuring the durability of the face (200) and avoidance of the formation of stress fractures on the face (200). This is particularly true near the center face (250). Thus, maintaining a very small center face indicia depth (256) ensures that the thickness of the face (200) does not need to be increased to accommodate the center face permanent indicia (252). The center face indicia depth (256) is preferably less than about 0.15 mm.

In some embodiments the face (200) simply has a polished, or brushed, metal finish, while other embodiments are directed to golfers that prefer a darker face (200), which is increasingly common today with golf club heads having white or colored crowns due to an improvement in the ability to align the golf club head. While providing contrasting dark areas facilitates a golfer's perception of a golf club, clubs such as drivers, fairway woods, and hybrid/utility clubs ("wood-style clubs") do not typically include the substantial number of alignment aids. Alignment of wood-style clubs is especially important because if the striking surface is not properly aligned at impact, then the landing position of the ball will be farther off-line than shots with irons or a putter with equivalent impact misalignments. For example, if a driver is misaligned so as to be 2 degrees open at impact, the struck ball will end up about 24 yards off-line relative to the intended path, assuming an initial ball speed of 145 mph. Similarly, if a 6-iron is 2 degrees open relative at impact, the struck ball will end up about 13 yards off-line, and a wedge at 2 degrees open would be 2 yards off-line. In order to return the club to square at impact, the club face is preferably precisely aligned at address, prior to impact. For most golfers, a repeatable swing is difficult to achieve, and without a repeatable address alignment, even a repeatable swing will not produce repeatable results.

The face coating (290) may be a dark diffusely reflecting surface having a chroma value of less than 1. Further, the face coating (290) may have a CIELab brightness of less than 40, and may further have a gloss value of less than 60 gloss units. Since alignment of the golf club head (100) is so important, it is desirable that the center face permanent indicia (252) does not distract the golfer, particularly since the golfer is generally focused on the vicinity of the center face (250) at address and the center face permanent indicia (252) is often not symmetrical. As the loft of a golf club head (100) increases the golfer is able to see more of the face (200), and is more likely to notice the center face permanent indicia (252), at address. Thus, one embodiment incorporates low to medium contrast between the face (200) and the center face permanent indicia (252). In this embodiment the center face permanent indicia (252) has a center face permanent indicia CIELab L* value, the face (200) has a face CIELab L* value, and the difference between the center face permanent indicia L* value and the face L* value is related to the volume and the loft of the golf club head (100). In one embodiment the difference in L* value is governed by the equation $\Delta L^* \leq [(\text{volume})/100 \times (\text{loft})]$. Thus, a large volume low lofted golf club head (100) such as a 9 degree 460 cc driver is able to accommodate a larger difference between the center face permanent indicia L* value and the face L* value, without being distracting to the golfer at address. Further, a smaller volume higher lofted golf club head (100) such as a 21 degree 100 cc hybrid type golf club head may support less of a difference between the center face permanent indicia L* value and the face L* value, without being distracting to the golfer at address. An even less potentially distracting embodiment the difference in L* value is governed by the equation $\Delta L^* \leq [(\text{volume})/125 \times (\text{loft})]$. A further embodiment reduces the potential for distraction by maintaining the difference between the center face permanent indicia L* value and the face L* value at less than 25; and another embodiment produces a very low contrast with the difference between the center face permanent indicia L* value and the face L* value is less than 10. In an even further embodiment the center face permanent indicia CIELab L* value changes throughout the center face permanent indicia (252). Such a varying center face permanent indicia CIELab L* value may make the center face permanent indicia (252) less noticeable to golfers when in the address position, while remaining easily discernable when holding the face (200) directly in front of them. In one variation of this embodiment the highest center face permanent indicia CIELab L* value is located at the lowest portion of the center face permanent indicia (252) and the L* value decreases as the elevation of the ground plane (GP) increases.

In order to further aid in a golfer's alignment, some embodiments of the golf club head (100) include at least one linear face marking (280) having a linear face marking L* value, as seen in FIG. 2 and often referred to as a score line or groove. In this embodiment a higher contrast between the linear face marking (280) and the face (200) is desirable so a golfer can easily distinguish this feature that may aid in alignment and reduce the likelihood of the golfer focusing on the center face permanent indicia (252). Thus, the difference between the linear face marking L* value and the face L* value is at least 30.

The at least one linear face marking (280) may include numerous distinct linear face markings (280) as seen in FIG. 2. Whether the at least one linear face marking (280) is a single marking or multiple markings, there will be a total linear face marking surface area (284). For example, if a face (200) contains at least one linear face marking (280) with a total length of 250 mm and a width of 1 mm then the total linear face marking surface area (284) is 250 mm². Since the at least one linear face marking (280) aids a golfer in alignment and takes the golfer's focus off the center face permanent indicia (252), in one embodiment it is preferred to have the center face indicia surface area (258) less than the linear face marking surface area (284). In an even further embodiment the center face indicia surface area (258) is less than 50% of the linear face marking surface area (284).

However, reducing the center face indicia surface area (258) too far has diminishing returns and the center face indicia surface area (258) should remain large enough to be easily identifiable when a golfer holds the golf club head (100) with the face (200) pointing at the golfer, while remaining small enough to not distract the golfer when looking at the golf club head (100) while addressing a golf ball. Therefore, in one embodiment the center face indicia surface area (258) remains at least 15% of the linear face marking surface area (284). An additional embodiment relates the center face indicia surface area (258) to the striking surface area (232) within 0.75 inches of the center face (250). In this embodiment the center face indicia surface area (258) is at least 3% of the striking surface area (232) within 0.75 inches of the center face (250). Skilled golfers are more likely to notice nontraditional markings on the face (200) at address, therefore in another embodiment the center face indicia surface area (258) is capped to be less than 20% of the striking surface area (232) within 0.75 inches of the center face (250).

Since at least one linear face marking (280) may be incorporated into the golf club head (100) to reduce the likelihood that a golfer is distracted by the center face permanent indicia (252) while addressing a golf ball, a further embodiment positions the at least one linear face marking (280) so that a portion of it is vertically below a portion of the center face permanent indicia (252). An alternative embodiment positions the at least one linear face marking (280) so that a portion of it is vertically above a portion of the center face permanent indicia (252), while an even further embodiment positions the at least one linear face marking (280) so that a portion of it is vertically below a portion of the center face permanent indicia (252) and a portion of it is vertically above a portion of the center face permanent indicia (252). The spacing of the at least one linear face marking (280) above and/or below the center face permanent indicia (252) may be such that the vertical separation distance from the portion of the linear face marking (280) to the imaginary rectangular box, illustrated in FIG. 2, used to define the center face indicia surface area (258), is at least 0.5 inches to resemble a more traditional appearance. However, in one embodiment the spacing of the at least one linear face marking (280) above and/or below the center face permanent indicia (252) is such that the vertical separation distance is less than 0.25 inches to even further obscure the center face permanent indicia (252) when viewing the face (200) from the address position.

To further instill consumer confidence in the testing and marking of each unique golf club head (100), a further embodiment includes a permanent center face indicator at the location of the face center (250) to illustrate the exact point on the face (200) that the center face CT was measured. For instance, FIG. 2 illustrates the permanent center face indicator as a simple dot or circle, although it could also be represented with cross-hairs, as seen in FIG. 3, an arrow, or any easily identifiable symbol.

As previously noted, in some embodiments the center face permanent indicia (252) is formed in the face (200) or the face coating (290) by removing a portion of the face (200) or the face coating (290), thereby producing a center face indicia depth (256) that may be constant or vary. Further, some embodiments incorporate at least one linear face marking (280) that may be a simple marking on the face (200) or may be formed in the face (200), or face coating (290), to produce a linear face marking depth (282). One particular durable embodiment has a maximum center face indicia depth (256) that is less than the maximum linear face marking depth (282), while a further embodiment keeps the maximum center face indicia depth (256) at less than 50% of the maximum linear face marking depth (282), and an even further embodiment maintains the maximum center face indicia depth (256) at less than 10% of the maximum linear face marking depth (282). The maximum linear face marking depth (282) is preferably less than 0.2 mm.

As one skilled in the art will understand, the face (200) of every golf club head (100) has a face surface roughness and a face area. Further, the center face permanent indicia (252) has a permanent indicia surface roughness. A golf club head (100) with a large face area and low loft can support a larger difference between the permanent indicia surface roughness and the face surface roughness with minimal impact on the flight characteristics of a golf ball struck by the golf club head (100). In one embodiment the difference between the permanent indicia surface roughness and the face surface roughness is related to the loft and the face area by the equation $\Delta SR \geq [60*(\text{face area})/(\text{loft})]$, for lofts less than 25 degrees, wherein the permanent indicia surface roughness is greater than the face surface roughness. For example, a 460 cc driver having a loft of 10 degrees and a face area of 6.8 square inches has the difference between the permanent indicia surface roughness and the face surface roughness of $\Delta SR \geq [60*(6.8)/(10)]$, or a $\Delta SR \geq 40.8$ μin. In another example, a 150 cc three wood having a loft of 15 degrees and a face area of 2.9 square inches has the difference between the permanent indicia surface roughness and the face surface roughness of $\Delta SR \geq [60*(2.9)/(15)]$, or a $\Delta SR \geq 11.6$ μin. In a further example, a 100 cc hybrid 3-iron having a loft of 21 degrees and a face area of 3.6 square inches has the difference between the permanent indicia surface roughness and the face surface roughness of $\Delta SR \geq [60*(3.6)/(21)]$, or a $\Delta SR \geq 10.3$ μin.

In a further embodiment the permanent indicia surface roughness of at least 10 μin greater than the adjacent face surface roughness, and in some embodiments with very low face surface roughness the permanent indicia surface roughness may be at least twice the adjacent face surface roughness. In a further low face surface roughness face embodiment it is preferred to have a permanent indicia surface roughness of less than fifteen times the adjacent face surface roughness. In one particular embodiment a polished PVD face of the golf club head (100) may have a face surface roughness of about 7 μin, whereas the permanent indicia surface roughness may be about 77 μin. In another embodiment the face surface roughness is preferably 5-70 μin when measured in a parallel direction to the grooves, and the permanent indicia surface roughness is preferably 50-90 μin when measured in a parallel direction to the grooves.

Conversely, in another embodiment, higher lofted golf club heads (100), namely those with a loft of at least 25 degrees, preferably have a smaller difference between the permanent indicia surface roughness and the face surface roughness. In this embodiment the difference between the face surface roughness and the permanent indicia surface roughness is related to the loft and the face area by the equation $\Delta SR \leq [200*(\text{face area})/(\text{loft})]$, wherein the face surface roughness is greater than the permanent indicia surface roughness. Such higher lofted clubs are generally iron golf club heads (100) that do not have a polished face (200) and may have a textured face (200). Therefore, the face surface roughness may be reduced by the addition of the center face permanent indicia (252), which is undesirable in higher lofted golf club heads (100) where increased spin is desirable. For example, a 5-iron having a loft of 27 degrees and a total face area of 4.6 square inches has the difference between the permanent indicia surface roughness and the face surface roughness of $\Delta SR \leq [200*(4.6)/(27)]$, or a $\Delta SR \leq 34$ μin.

In one particular embodiment, an iron type golf club head (100) may have a face surface roughness of about 20-200 μin when measured in a parallel direction to the grooves, whereas the permanent indicia surface roughness may be less than face surface roughness, but preferably within the 34 μin calculated using the above equation. In another embodiment the face surface roughness is preferably 70-100 μin when measured in a parallel direction to the grooves, and the permanent indicia surface roughness is preferably 50-90 μin when measured in a parallel direction to the grooves. The surface finishes discussed above may vary depending on design choice and the examples given do not limit the types of surface finishes that may be used with this invention. Known surface finishes include: no plating or a hot oil finish that is designed to rub off, exposing the underlying metallic club head material, resulting in rust; nickel plating of various colors; anodizing of various colors; chrome plating; media blasting; and etching, just to name a few. Further, the surface roughness of the surface finishes discussed above may vary depending on design choice and examples given do not limit the range of surface roughness that may be used with this invention. For example, smooth or shiny surface finishes will have a small surface roughness value and will generally result in less friction. Rough, textured or matte finishes will have a larger surface roughness value and will generally result in more friction. Further the face (200) may be textured, milled, cast, or otherwise created to have surface features or patterns that would create greater friction when compared to a similar face (200) with the same measured surface roughness but without the textured, milled, cast or otherwise created surface features or patterns.

Other permanent indicia, separately or together, may be incorporated in further embodiments. All of the disclosure directed to the center face permanent indicia (252) and the various relationships of the coating (290); the coating thickness (292); the center face indicia depth (256); the chroma value; the permanent indicia surface roughness; the permanent indicia surface area; the face surface roughness; the differences in surface roughness; the volume; the loft; the brightness; the gloss units; the L* values; the differences in the permanent indicia L* value and the face L* value; the at least one linear face marking (280); the linear face marking surface area (284); the face surface area; the linear face marking L* value; the at least one linear face marking (280), its location, surface area, and depth (282); and the construction, make-up, depth, and roughness of the permanent indicia; equally apply to a first permanent indicia (310), a second permanent indicia (410), a third permanent indicia (510), a fourth permanent indicia (610), and a max performance permanent indicia (710), but will not be repeated for each permanent indicia in the sake of brevity.

Figure 8:
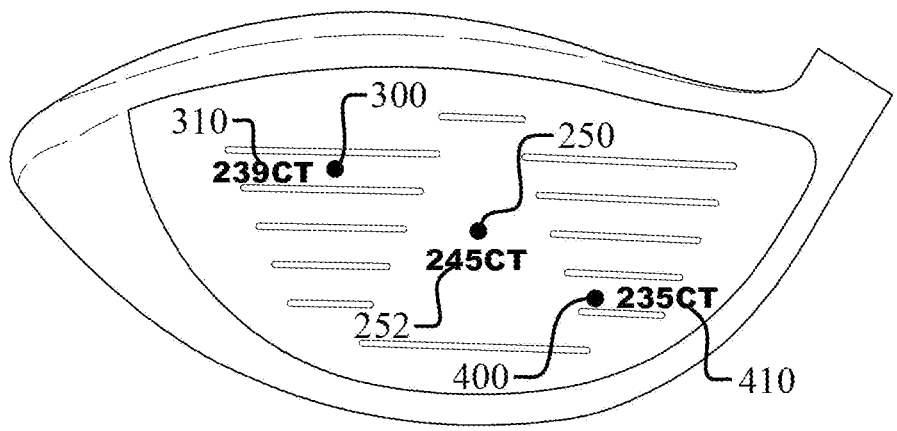
FIG. 8 shows a front elevation view of a golf club head of the present invention, not to scale.

For instance, one embodiment of the golf club head (100) may have a first permanent indicia (310) located on a face toe portion (260) of the face (200) indicative of a first CT, COR, or potential SF measured at a first face point (300), or calculated based upon at least one measured value, located on a face toe portion (260), as seen in FIG. 8. The first permanent indicia (310) may be the only permanent indicia on the golf club head (100), or may be incorporated with one or more of the other disclosed permanent indicia. In this embodiment the face (200) has a first thickness (320) at the first face point (300), and the first permanent indicia (310) has a first indicia surface area (340). In one particular embodiment the golf club head (100) includes at least the center face permanent indicia (252) and the first permanent indicia (310), and the location of the first permanent indicia (310) is such that the first thickness (320) is different than the center face thickness (254). In another embodiment having both the center face permanent indicia (252) and the first permanent indicia (310), the first face point (300) is located higher on the face (200) than the face center (250), as seen in FIG. 8.

Similarly, another embodiment of the golf club head (100) may have a second permanent indicia (410) located on a face heel portion (270) of the face (200) indicative of a second CT, COR, or potential SF measured at a second face point (400), or calculated based upon at least one measured value, located on a face heel portion (270), also seen in FIG. 8. The second permanent indicia (410) may be the only permanent indicia on the golf club head (100), or may be incorporated with one or more of the other disclosed permanent indicia. In this embodiment the face (200) has a second thickness (420) at the second face point (400), and the second permanent indicia (410) has a second indicia surface area (440). In one particular embodiment the golf club head (100) includes at least the center face permanent indicia (252) and the second permanent indicia (410), and the location of the second permanent indicia (410) is such that the second thickness (420) is different than the center face thickness (254). In another embodiment having both the center face permanent indicia (252) and the second permanent indicia (410), the second face point (400) is located lower on the face (200) than the face center (250), as seen in FIG. 8.

Even further, another embodiment of the golf club head (100) may have a center face permanent indicia (252), a first permanent indicia (310) located on the face toe portion (260), and a second permanent indicia (410) located on a face heel portion (270). In a variation of this embodiment the first face point (300) is located higher on the face (200) than the face center (250), and the second face point (400) is located lower on the face (200) than the face center (250), as seen in FIG. 8, thereby informing the consumer of the actual measure performance of the golf club head (100) throughout a common impact pattern of low-heel impacts to high-toe impacts. In a further variation of this embodiment at least one of the first thickness (320) or the second thickness (420) is different from the center face thickness (254); while in a further embodiment both the first thickness (320) and the second thickness (420) are different from the center face thickness (254), and the first thickness (320) is different than the second thickness (420).

Still further, any of the embodiments having a first permanent indicia (310) or a second permanent indicia (410), either alone, together, or in combination with other permanent indicia, may position the first permanent indicia (310) and/or the second permanent indicia (410) on the face (200) to provide the consumer with an indication of how the actual club head specific CT, COR, or potential SF varies at a point, or points, near a face perimeter (210). For example, consumers expect equipment companies to achieve reasonably high CT, COR, or potential SF values at the face center (250), although consumers rarely fully appreciate the variations from club head to club head. However most golfers do not consistently impact the golf ball at the face center (250) and therefore may be better served by knowing the actual measured CT, COR, or calculated potential SF on a point of the face (200) closer to the location that the golfer most consistently impacts a golf ball. Such locations are generally nearer the face perimeter (210).

Therefore, in one embodiment a shortest distance along the face (200) from the first face point (300) to the face perimeter (210) is less than the Xcg distance, or even less than seventy-five percent of the Xcg distance, or still further less than fifty percent of the Xcg distance. As one skilled in the art will appreciate, the golf club head (100) includes a bore having a center that defines a shaft axis (SA) which intersects with a horizontal ground plane (GP) to define an origin point and establish a vertical shaft axis plane (SAP). Further, the golf club head (100) has a center of gravity (CG) located: (i) vertically from the origin point a distance Ycg; (ii) horizontally from the origin point a distance Xcg that parallel to the shaft axis plane (SAP) and the ground plane (GP); and (iii) a distance Zcg from the origin in a direction orthogonal to the shaft axis plane (SAP). In a similar embodiment a shortest distance along the face (200) from the first face point (300) to the face perimeter (210) is less than the Xcg distance, or even less than seventy-five percent of the Xcg distance or still further less than fifty percent of the Xcg distance. In a further embodiment incorporating both a first permanent indicia (310) and a second permanent indicia (410), a vertical separation distance parallel to the shaft axis plane (SAP) from the first face point (300) to the second face point (400) is greater than the Ycg distance. Another embodiment incorporating both a first permanent indicia (310) and a second permanent indicia (410) has a horizontal separation distance parallel to the shaft axis plane (SAP) from the first face point (300) to the second face point (400) that is greater than the Xcg distance.

One particular embodiment incorporates a center face permanent indicia (252), a first permanent indicia (310), and at least one linear face marking (280) having a linear face marking surface area (284). Here the sum of the center face indicia surface area (258) and the first indicia surface area (340) is at least 25% of the linear face marking surface area (284), for the reasons previously disclosed. A further variation of this embodiment has a sum of the center face indicia surface area (258) and the first indicia surface area (340) that is also less than the linear face marking surface area (284); while an even further variation has a sum of the center face indicia surface area (258) and the first indicia surface area (340) that is less than 50% of the linear face marking surface area (284).

A similar embodiment incorporates a center face permanent indicia (252), a second permanent indicia (410), and at least one linear face marking (280) having a linear face marking surface area (284). Here the sum of the center face indicia surface area (258) and the second indicia surface area (440) is at least 25% of the linear face marking surface area (284), for the reasons previously disclosed. A further variation of this embodiment has a sum of the center face indicia surface area (258) and the second indicia surface area (440) that is also less than the linear face marking surface area (284); while an even further variation has a sum of the center face indicia surface area (258) and the second indicia surface area (440) that is less than 50% of the linear face marking surface area (284).

Figure 9:
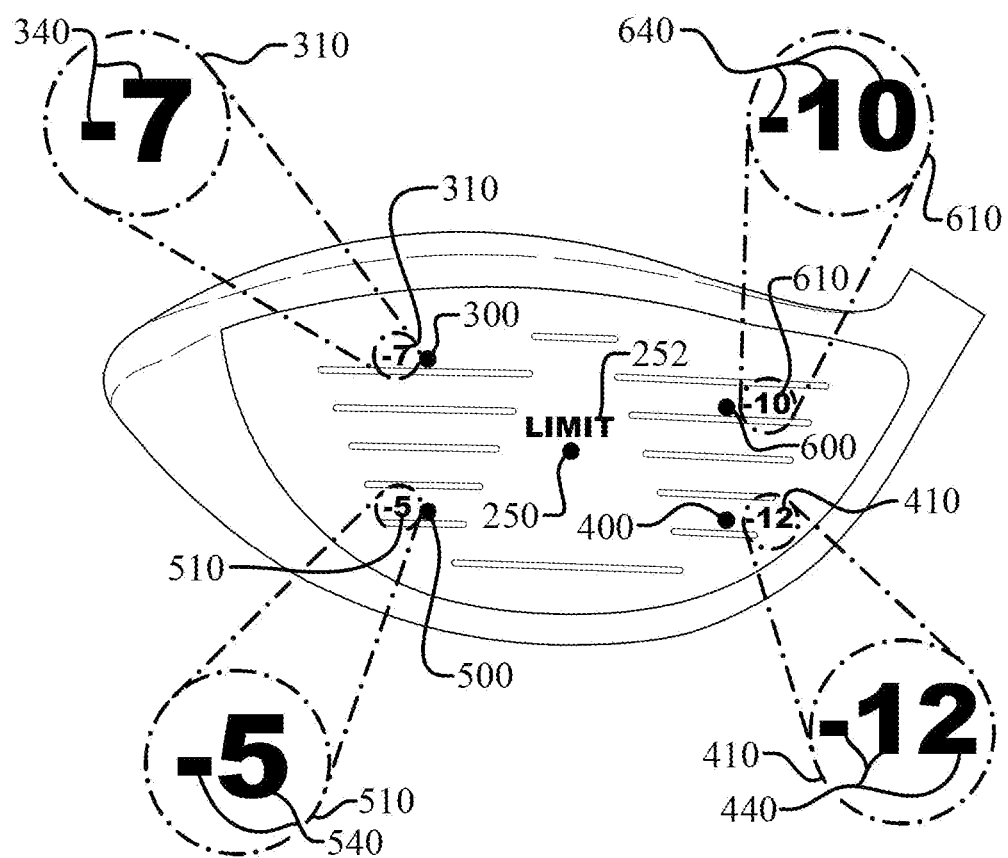
FIG. 9 shows a front elevation view of a golf club head of the present invention, not to scale.

Another embodiment of the golf club head (100) may have a third permanent indicia (510) located on a face toe portion (260) of the face (200) indicative of a third CT, COR, of potential SF measured at a third face point (500), or calculated based upon at least one measured value, located on a face toe portion (260), as seen in FIG. 9. The third permanent indicia (510) may be the only permanent indicia on the golf club head (100), or may be incorporated with one or more of the other disclosed permanent indicia. In this embodiment the face (200) has a third thickness (520) at the third face point (500), and the third permanent indicia (510) has a third indicia surface area (540). In one particular embodiment the golf club head (100) includes at least the first permanent indicia (310) and the third permanent indicia (510), and the location of the first permanent indicia (310) is such that the first thickness (320) is different than the third thickness (520). In another embodiment having both the first permanent indicia (310) and the third permanent indicia (510), the first face point (300) is located higher on the face (200) than the face center (250) and the third face point (500) is located lower on the face (200) than the face center (250), as seen in FIG. 9.

Similarly, another embodiment of the golf club head (100) may have a fourth permanent indicia (610) located on a face heel portion (270) of the face (200) indicative of a fourth CT, COR, of potential SF measured at a fourth face point (600), or calculated based upon at least one measured value, located on a face heel portion (270), also seen in FIG. 9. The fourth permanent indicia (610) may be the only permanent indicia on the golf club head (100), or may be incorporated with one or more of the other disclosed permanent indicia. In this embodiment the face (200) has a fourth thickness (620) at the fourth face point (600), and the fourth permanent indicia (610) has a fourth indicia surface area (640). In one particular embodiment the golf club head (100) includes at least the second permanent indicia (410) and the fourth permanent indicia (610), and the location of the second permanent indicia (410) is such that the second thickness (420) is different than the fourth thickness (620). In another embodiment having both the second permanent indicia (410) and the fourth permanent indicia (610), the second face point (400) is located lower on the face (200) than the face center (250) and the fourth face point (600) is located higher on the face (200) than the face center (250), as seen in FIG. 9.

Figure 10:
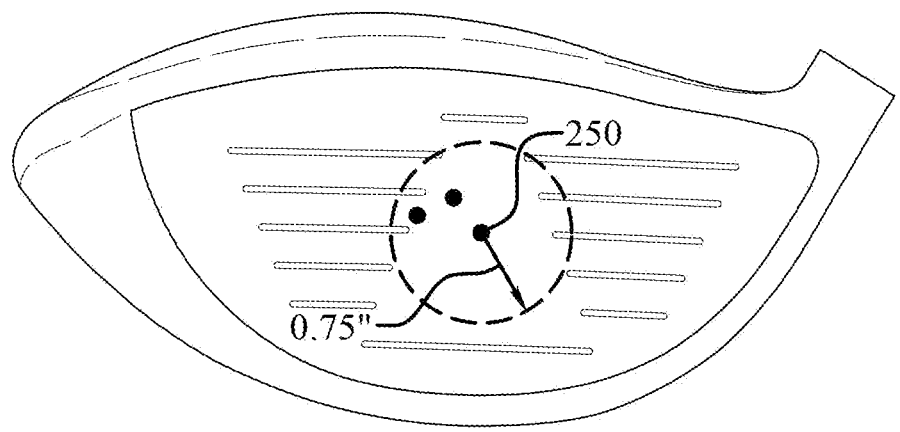
FIG. 10 shows a front elevation view of a golf club head of the present invention, not to scale.
Figure 11:
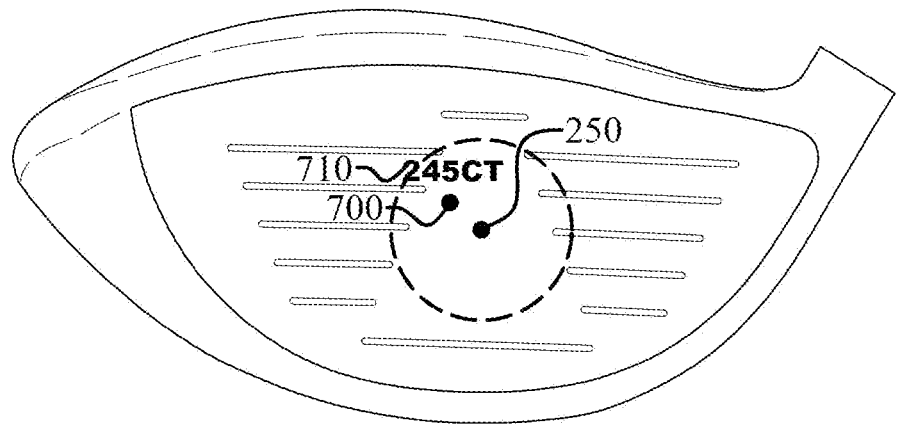
FIG. 11 shows a front elevation view of a golf club head of the present invention, not to scale.

The golf club head (100) may have a max performance permanent indicia (710) that is indicative of the maximum CT or COR of the golf club head (100). Some times the maximum CT or COR of a golf club head (100) is not located at the face center (250). Therefore a golfer may want to know the location on the face (200) that has the maximum CT or COR. This embodiment involves identifying a max performance face point (700) on the face (200) of the golf club head (100) within 0.75 inches of the center face (250) having a max CT or COR. This process involves first identifying the face center (250) and measuring the face center CT or COR, then selecting at least two additional points on the face (200) within 0.75 inches of the center face (250) and measuring the CT or COR associated with these two points, as seen in FIG. 10. The point with the highest measured CT or COR value is then identified as the max performance face point (700), which may not correspond with the center face (250) as seen in FIG. 11. As one skilled in the art will appreciate, this process is easily automated such that once the face center (250) is determined the golf club head (100), or the measurement tool, is automatically repositioned to any number of predetermined locations to have the actual CT measure for each location. The automated system then identifies the predetermined location that produced the max CT. While the first embodiment tested the center face (250) and two additional points, a further embodiment tests at least four points within 0.75 inches of the center face (250). The max performance permanent indicia (710) may then be created using any of the techniques and relationships identified herein with respect to the other permanent indicia, but with a max performance point thickness (720), a max performance indicia depth (730), and a max performance indicia surface area (740).

Numerous methods may be used to apply the disclosed permanent indicia to the golf club head (100). Such techniques include etching methods, oxidation techniques, peening methods, engraving techniques, media blasting processes, machining methods, cutting processes, painting, application of durable inks and/or coatings. For example, etching techniques using laser processing, chemical processing, or through the use of a photosensitive light-activated coating process may be used. Further, lasers also can be configured to produce markings that do not remove material to alter the depth of the face (200) or face coating (290); instead, the laser energy oxidizes the material of the face (200) or face coating (290), resulting in color change. This color change leads to a marking that is visible without imparting spin to a golf ball. The preferred laser type used is a Yttrium-Aluminum-Garnet (YAG) laser, such as the HM 1400 marketed by GSI Lumionics of Ottawa, Canada. Preferably, a 6-inch diameter lens having a 254 mm focal length is used. The impact surface 20 preferably is placed about 0.2 inches (5 mm) above the focal point of the lens, using a feed rate of 100 mm/s, a pulse frequency of 20 kHz, and a power level of 80%. The golf club head (100) is fixtured under the laser normal to the beam axis. The permanent indicia marking pattern to be added to the face (200) can be loaded into the laser apparatus control as an HPGL format file, and the pattern can be burned onto the face (200) more than once if necessary to achieve a desired appearance.

Figure 12:
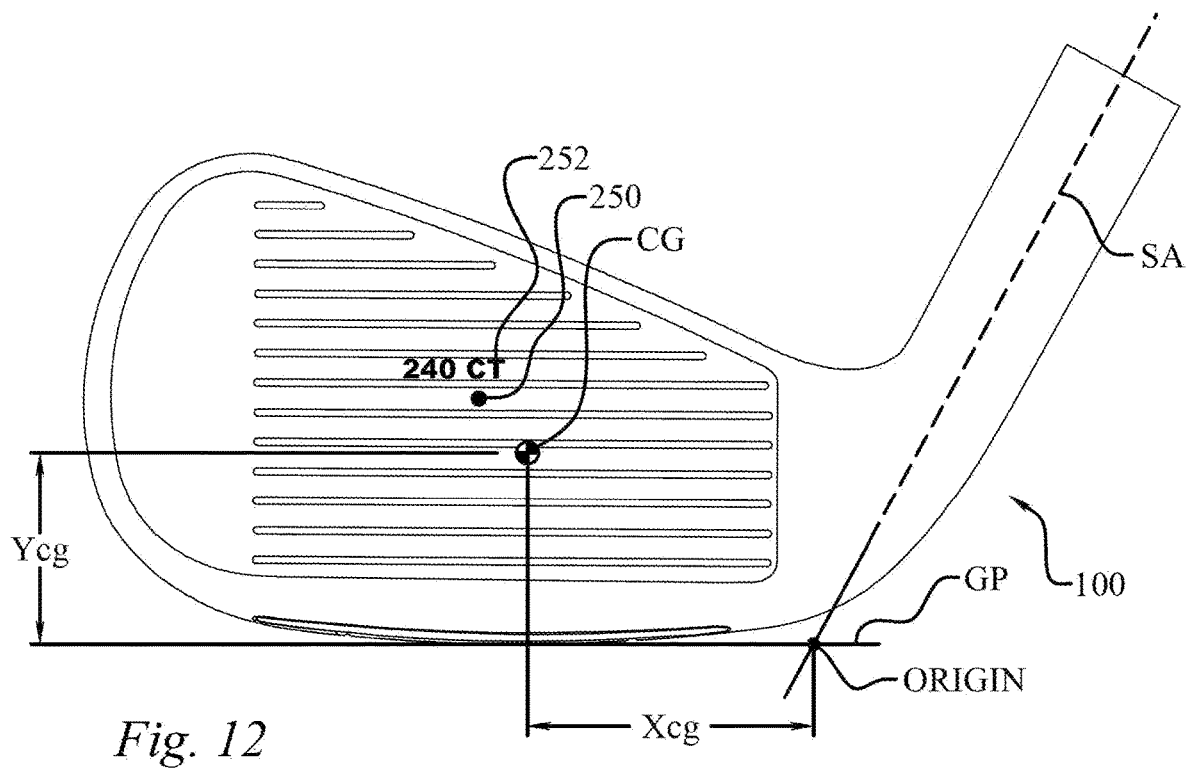
FIG. 12 shows a front elevation view of a golf club head of the present invention, not to scale.
Figure 13:
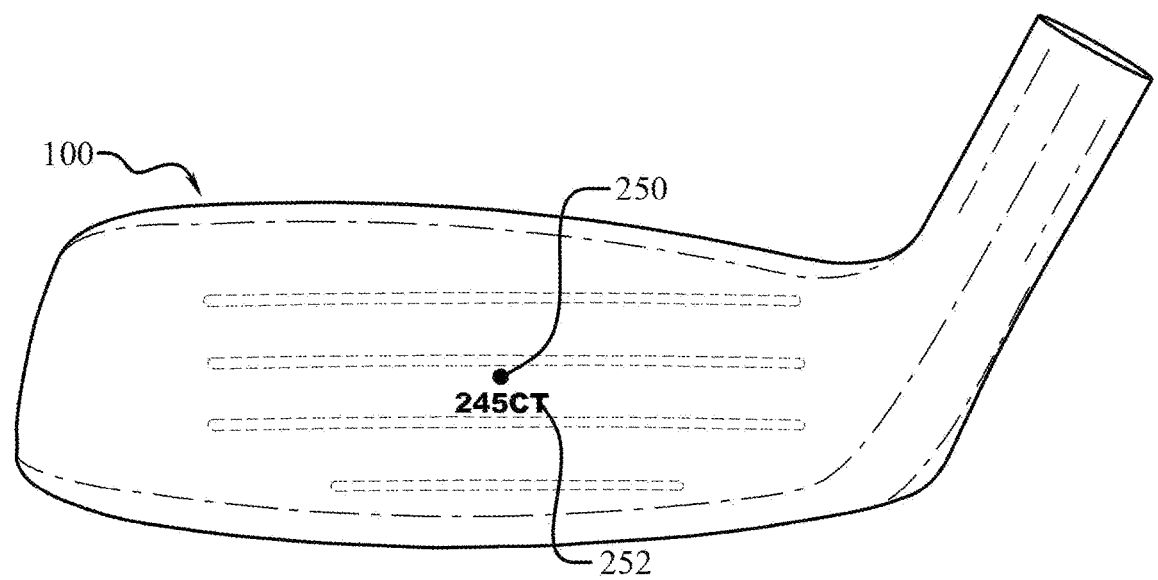
FIG. 13 shows a front elevation view of a golf club head of the present invention, not to scale.

While the golf club head (100) illustrated in FIGS. 1-11 is a driver, one skilled in the art will appreciate that golf club head (100) is not limited to drivers and that the same principles apply to fairway woods, hybrids, as seen in FIG. 13, and irons as seen in FIG. 12.

In another embodiment of the golf club head (100) at least a perimeter portion of the crown adjacent a top portion of the face (200) has an area that is at least 5% of the crown area has a bright, diffusely reflecting surface, and at least a top perimeter portion of the face (200) has a dark diffusely reflecting surface area. In some embodiments, the bright, diffusely reflecting portion of the crown is white and includes at least the upper facing portion of the crown, and the face (200) surface is a dark diffusely reflecting surface. In other examples, the bright, diffusely reflecting portion of the crown has a chroma value of less than 5, and the face plate surface has a chroma value of less than 1. In additional representative examples, the bright, diffusely reflecting portion of the crown has a brightness of at least 80. In some examples, at least a portion of the crown adjacent a top perimeter of the face (200) has a semigloss surface with a chroma value of less than 10 and a brightness of at least 50. In other examples, the bright diffusely reflecting surface extends over at least 80% of the upward facing crown area or the crown surface has a CIELab brightness of between 50 and 100, and a gloss value of less than 60 gloss units. In still further examples, the dark, diffusively reflecting face (200) surface area has a CIELab brightness of less than 40 and a chroma of less than 10 or the face plate has a gloss value of less than 60 gloss units. In other examples, a difference in L* values between the crown and the face (200) is high contrast for more than about 14.3%, 28.6%, 42.9%, 57.1%, 71.4%, or 85.7% of the face distance.

In additional examples, a transparent matte coating is situated on at least the upward facing portion of the crown, wherein the transparent matte surface is a semigloss or low gloss surface, having a gloss value of less than 60 gloss units. In some alternatives, at least the upward facing portion of the crown surface has a chroma value of less than 5 or less than 2. In still other examples, at least a top portion of the face (200) adjacent the crown has a black surface treatment that is a semigloss or low gloss surface. In some examples, the face (200) has a gloss value of less than 60, 50, or 40 gloss units. In particular examples, the black surface treatment has a chroma of less than 1 or 0.9 and a brightness of less than 50 or 30. In some embodiments, the face (200) has a black surface treatment having a chroma of less than 1.0 and a brightness of less than 50, and at least the upward facing portion of the crown surface has a chroma value of less than 5 and a brightness greater than 85. Examples of diffuse surface treatments include paints, matte clear coats, clear coats, powder coatings, PVD, CVD, platings, ion platings, electroplatings, ceramic coatings. Examples of paints include urethane base coatings, pearl coats, epoxy based coatings, decals, inks, and primer coatings.

In some disclosed examples, surface gloss is referred to as semigloss or low gloss. As used herein, semigloss refers to a range of 10 to 70 gloss units measured with respect to a standard 60 degree geometry. However, some examples include semigloss surfaces having surface gloss in ranges having lower limits of 10, 20, 30, 40, 50, or 60 gloss units and upper limits of 20, 30, 40, 50, 60, or 70 gloss units. Similarly, low gloss surfaces include surfaces associated with standard gloss values of less than 10, 8, 5, 4, or 2 gloss units. Semigloss surfaces are typically preferred due to a chalky appearance that can be associated with low gloss surfaces. Gloss measurements can be conveniently made with portable glossmeters such as the MICRO-TRI-GLOSS meters from BYK Additives and Instruments.

Examples herein are described, for convenience, with respect to CIELab color space using L*a*b* color values or L*C*h color values, but other color descriptions can be used. As used herein, L* is referred to as lightness, a* and b* are referred to as chromaticity coordinates, C* is referred to as chroma, and h is referred to as hue. In the CIELab color space, +a* is a red direction, −a* is a green direction, +b* is a yellow direction, and −b* is the blue direction. L* has a value of 100 for a perfect white diffuser. Chroma and hue are polar coordinates associated with a* and b*, wherein chroma (C*) is a distance from the axis along which a*=b*=0 and hue is an angle measured counterclockwise from the +a* axis. The following description is generally based on values associated with standard illuminant D65 at 10 degrees. This illuminant is similar to outside daylight lighting, but other illuminants can be used as well, if desired, and tabulated data provided herein generally includes values for illuminant A at 10 degrees and illuminant F2 at 10 degree. These illuminants are noted in tabulated data simply as D, A, and F for convenience. The terms brightness and intensity are also used in the following description to refer to CIELab coordinate L*.

As seen in FIGS. 14-18 another embodiment incorporates a removable face template (800) that is uniquely marked with performance indicating indicia indicating the actual measured characteristics of the face. In one embodiment the removable face template (800) is attached to the golf club head (100) so that a consumer can view the performance indicating indicia of a particular golf club head (100) at a store prior to purchase and make a more educated purchasing decision. The consumer may then remove the removable face template (800) prior to play and may retain the removable face template (800) for their records of a particular golf club head (100), and the consumer may use it during future comparison shopping and/or as a selling point in the used golf club market.

Figure 7:
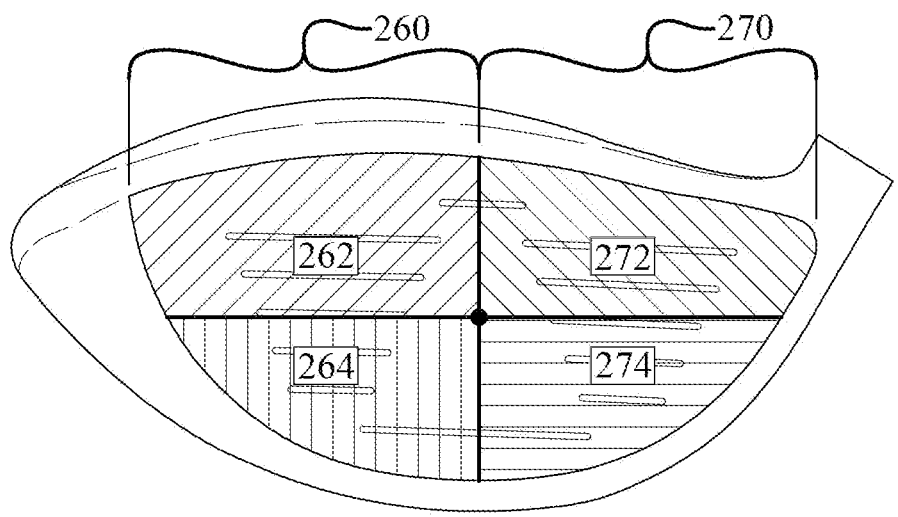
FIG. 7 shows a front elevation view of a golf club head of the present invention, not to scale.

While the removable face template (800) may be sold with the golf club head (100) as a kit, in another embodiment the removable face template (800) exists in electronic form so that a potential consumer can view the electronic face templates of an existing inventory and purchase the specific golf club head (100) associated with the desired electronic face template. Such an electronic ordering system may include the ability to search, or filter, the electronic face templates in a number of ways. For example a potential consumer may realize that their most common mishit is an impact high on the face (200) in the face toe portion (260), therefore this consumer can sort the inventory to display specific golf club heads (100) that possess higher than average CT values in the high toe region. Similarly, a consumer could also sort the inventory for preferred characteristics in upper face toe portion (262), the lower face toe portion (264), the upper face heel portion (272), and the lower face heel portion (274), as illustrated in FIG. 7. In one embodiment a consumer may move an electronic representation of a golf ball around on an electronic representation of the face (200) of a golf club head (100) to indicate the location that the consumer most commonly impacts a golf ball during the swing. A computer system may then filter the inventory to display golf club heads that have a higher than average CT, COR, or potential SF in the region covered by the representation of the golf ball. In this embodiment "higher than average" means that the computer system uses the electronic face templates of at least 5 of the golf club heads in inventory to determine an average regional CT, COR, or potential SF for the area of the face covered by the representation of the golf ball, then the computer system displays the golf club heads (100) in inventory that have at least one point on the face within the area covered by the representative golf ball wherein the CT, COR, or potential SF is greater than the average regional CT, COR, or potential SF.

Further, the potential consumer can sort the inventory by the face center CT, COR, or potential SF value. For instance, a skilled golfer may only care about the face center CT, COR, or potential SF and may be willing to pay a premium for a golf club head (100) that has a face center CT, COR, or potential SF above a certain value. Thus, the consumer may sort the inventory to only display available golf club heads (100) possessing a face center CT of at least 245 microseconds, or at least 250 microseconds, or at least 255 microseconds, or may only wish to view golf club heads (100) that have been individually tested and posses a face center CT of the current absolute maximum conforming value of 257 microseconds. Many golfers are willing to pay a premium for performance. In one embodiment the golf club head (100) may have a base price of $300 and a first tier performance characteristic premium of $20 is added for those with a face center CT of at least a first tier performance value such as 245 microseconds, while a second tier performance characteristic premium of $40 is added for those with a face center CT of at least a second tier performance value such as 250 microseconds, and a third tier performance characteristic premium of $60 is added for those with a face center CT of at least a third tier performance value such as 255 microseconds. Conversely, a bargain hunter may wish to play the same club as the professionals on TV yet may prefer to save some money and have the base price reduces by a first tier performance characteristic discount of $20 for a golf club head (100) with a face center CT of less than a first tier performance discount value such as 235 microseconds. Thus, an embodiment of this invention is an inventory management system containing at least one measure CT value of each golf club head (100) in inventory and allows customers to sort the inventory by the at least one measured CT value and/or a preferred CT distribution pattern.

Similarly, the consumer may sort the inventory to only display available golf club heads (100) possessing a face center COR of at least 0.822, or at least 0.826, or may only wish to view golf club heads (100) that have been individually tested and posses a face center COR of the current absolute maximum conforming value of 0.830. As previously noted, many golfers are willing to pay a premium for performance. In one embodiment the golf club head (100) may have a base price of $300 and a first tier performance characteristic premium of $20 is added for those with a face center COR of at least a first tier performance value such as 0.825, while a second tier performance characteristic premium of $40 is added for those with a face center COR of at least a second tier performance value such as 0.828, and a third tier performance characteristic premium of $60 is added for those with a face center COR of a third tier performance value such as 0.830. Conversely, a bargain hunter may wish to play the same club as the professionals on TV yet may prefer to save some money and have the base price reduces by a first tier performance characteristic discount of $20 for a golf club head (100) with a face center COR of less than a first tier performance discount value such as 0.822. Thus, an embodiment of this invention is an inventory management system containing at least one measure COR value of each golf club head (100) in inventory and allows customers to sort the inventory by the at least one measured COR value and/or a preferred COR or potential SF distribution pattern. The prior two paragraphs apply equally to the potential smash factor (SF) but will not be repeated for the sake of brevity. The inventory management system may include all golf club heads of a particular manufacturer or OEM, or the inventory management system may be specific to a particular retailer, and may, or may not, be limited to only one brand of golf clubs.

Figure 14:
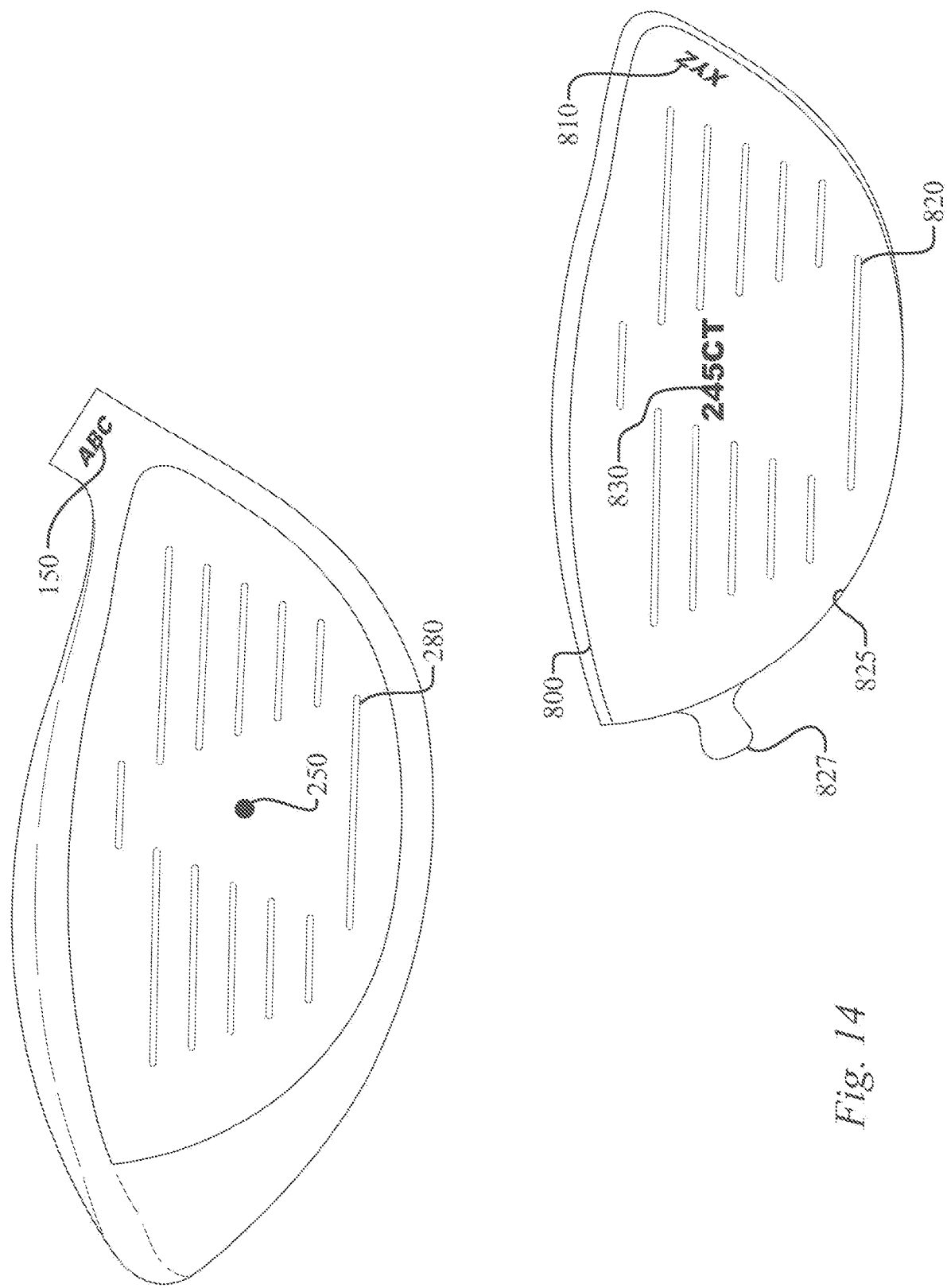
FIG. 14 shows a front elevation view of a golf club head of the present invention, not to scale.

Returning for the moment to embodiments with a physical removable face template (800), since each removable face template (800) contains at least one measured characteristic of a specific golf club head (100), the golf club head (100) includes a permanent club identifier (150), seen in FIG. 14, and the removable face template (800) has a template identifier (810) that is related to the permanent club identifier (150). For example, in one embodiment the permanent club identifier (150) is a permanent serial number on the golf club head (100), and the template identifier (810) is a marking that matches the serial number, or is a variation of the serial number such that a golfer can quickly identify that a particular removable face template (800), or electronic face template, was created for a particular golf club head (100).

Thus, all of the previous disclosure with respect to the permanent indicia on the face (200), namely the center face permanent indicia (252), the first permanent indicia (310), the second permanent indicia (410), the third permanent indicia (510), and the fourth permanent indicia (610), applies equally to the face template (800) embodiments but now the indicia is on the face template (800) as a center face indicia (830), a first indicia (840), a second indicia (850), a third indicia (860), and a fourth indicia (870), instead of on the face (200) of the golf club head (100). For the sake of brevity, all of the disclosure and embodiments related to each "permanent indicia" will not be repeated for each face template indicia, however it is understood that all the variations possible with the permanent indicia on the face are also possible with the template indicia on the face template.

The center face indicia (830) is indicative of the center face CT, COR, or SF, the first indicia (840) is indicative of the first CT, COR, or SF, the second indicia (850) is indicative of the second CT, COR, or SF, the third indicia (860) is indicative of the third CT, COR, or SF, and the fourth indicia (870) is indicative of the fourth CT, COR, or SF. The center face indicia (830), the first indicia (840), the second indicia (850), the third indicia (860), and/or the fourth indicia (870) can include numerals, letters, symbols, and/or changes in, or on, the surface of the face (200) that are indicative of the associated measured CT, COR, or SF, as described in detail herein with respect to the permanent indicia.

Figure 15:
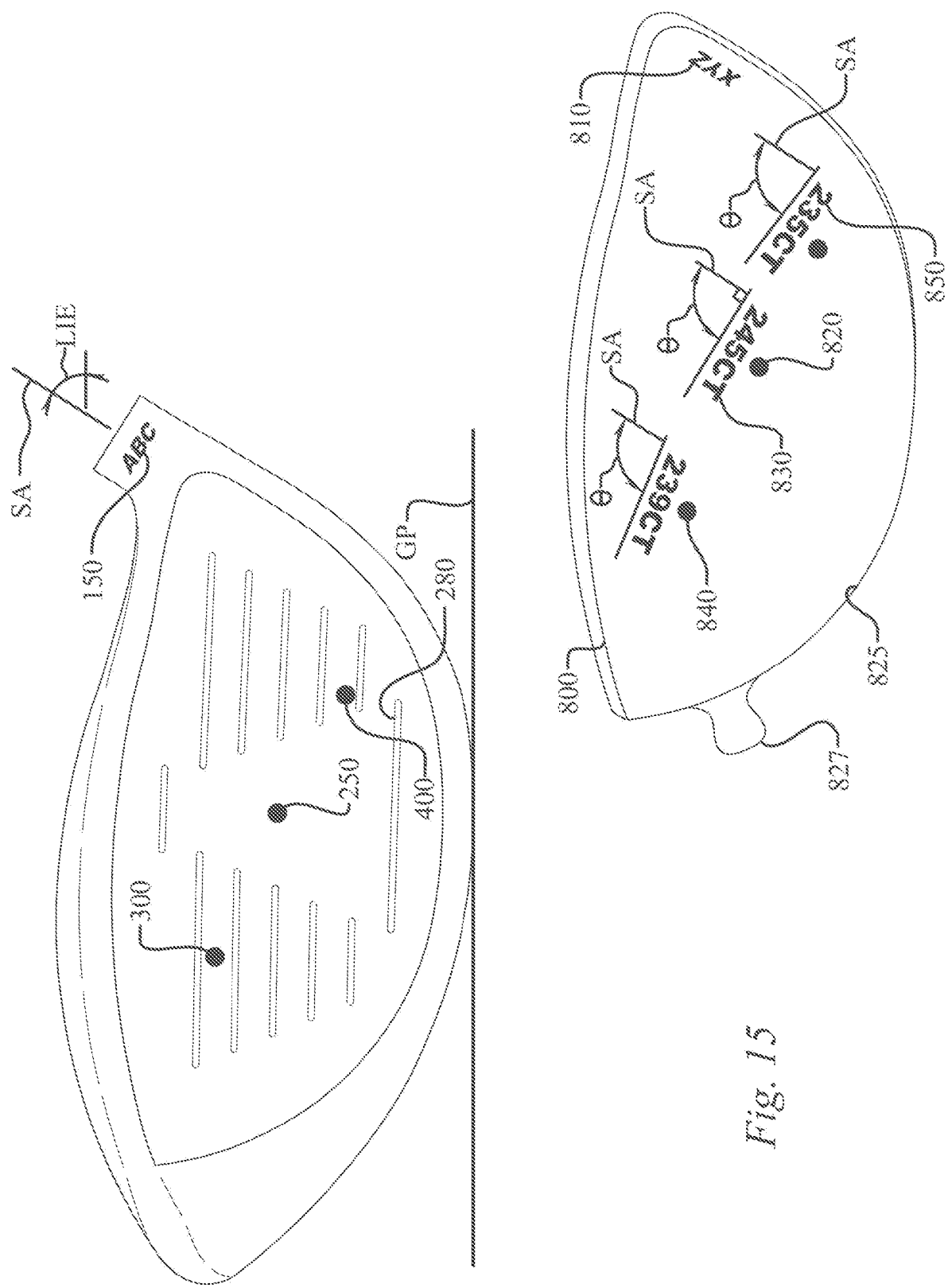
FIG. 15 shows a front elevation view of a golf club head of the present invention, not to scale.
Figure 16:
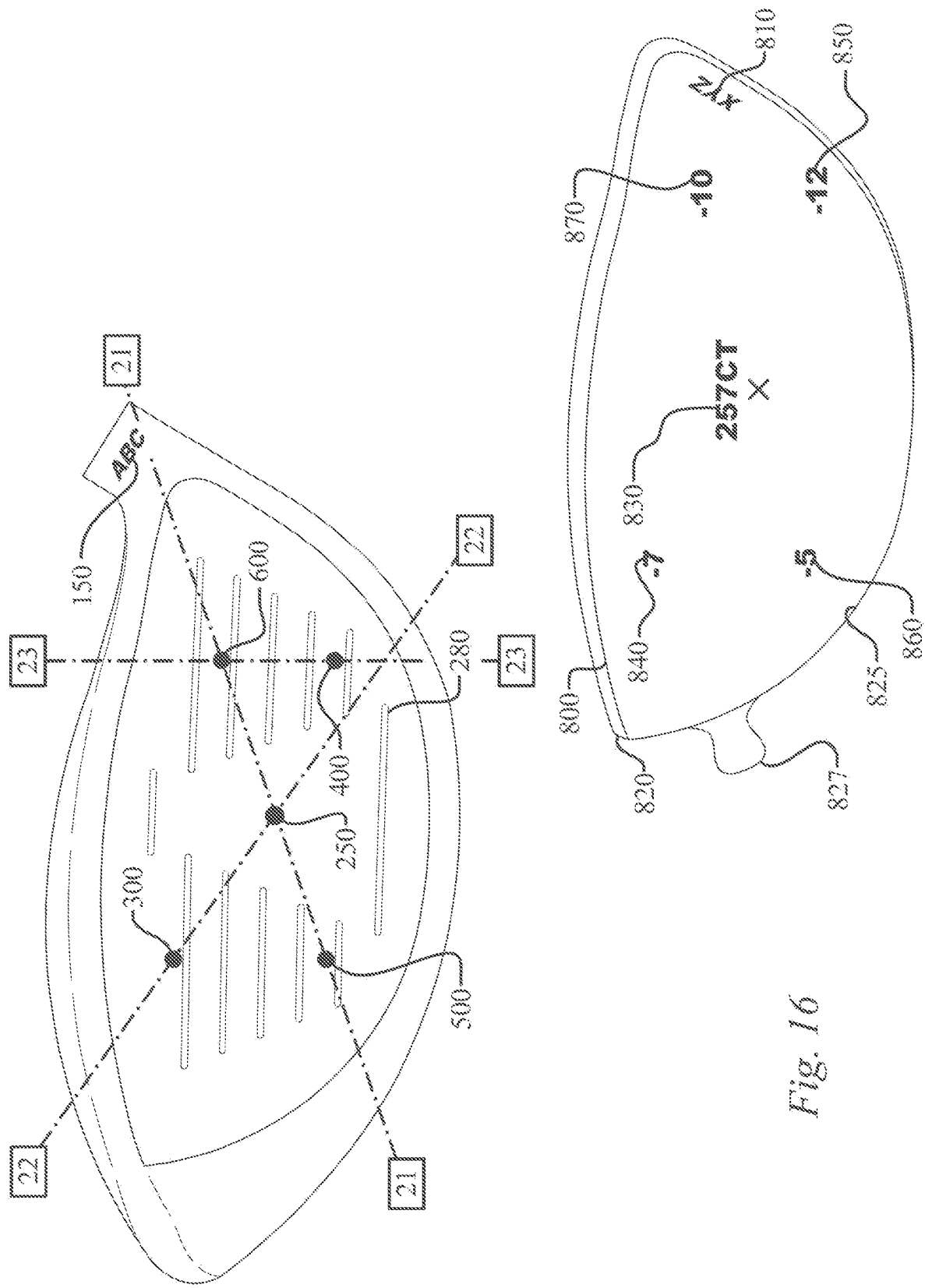
FIG. 16 shows a front elevation view of a golf club head of the present invention, not to scale.

In one embodiment the indicia, whether the permanent indicia (252, 310, 410, 510, 610) or the removable indicia (830, 840, 850, 860, 870), is oriented so that it may be easily read by a consumer when the golf club is in the typical sales presentation position, which is with the shaft pointed vertically at the ground and the face (200) pointed to the position of a prospective purchaser viewing the sales display, see FIG. 15. As one with skill in the art will recognize, a golf club head (100) has a design position in which it rests on a horizontal ground plane (GP) with a shaft axis (SA) at a predetermined lie angle. The axis of the indicia, which is a line under the indicia and parallel to the direction of the indicia, is oriented at an angle θ from the shaft axis (SA), wherein θ meets the following relationship: [90+0.3*(lie angle)≥θ≥90−0.3*(lie angle)]. In this embodiment the potential consumer may quickly scan the indicia of an entire rack of golf clubs on display and identify the golf club head (100) having the face performance characteristics that are desired.

The removable face template (800) has a template-to-face alignment indicator (820) corresponding to an aspect of the face (200) to align the removable face template (800) with a portion of the face (200). For example in one embodiment the template-to-face alignment indicator (820) is simply a symbol, window, or opening in the removable face template (800), as seen in FIG. 15, that can be aligned with an element of the golf club head (100) to repeatably position a portion of the face template (800) on a portion of the face (200) and convey one or more of the performance indicia to a potential consumer, as well as the approximate location that the performance characteristic was measured. For instance, in one embodiment the removable face template (800) is transparent so that when positioned on the face (200) a consumer may still see aspects of the face (200) through the removable face template (800). Thus, in FIG. 15 the face center (250) is labeled on the golf club head (100), and a similar marking is found on the removable face template (800) as the template-to-face alignment indicator (820) such that when aligned with the face center (250), the center face indicia (830), the first indicia (840), and/or the second indicia (850) are displayed on the golf club head (100) in a position close to the point on the face (200) that the measurements were performed.

In one particular embodiment the face (200) has at least one linear face marking (280), and a portion of the template-to-face alignment indicator (820) matches a portion of the at least one linear face marking (280) so the removable face template (800) is precisely positioned on the face (200) and a portion of the center face indicia (830) is within 0.25 inches of the face center (250), the measurement position of the center face CT or COR. The matching portion of the template-to-face alignment indicator (820) may be a cut-out portion of the removable face template (820), or in a transparent embodiment it may just be a line, or series of marks, that matches a portion of one of more of the at least one linear face marking (280), thereby aiding in alignment of the removable face template (820) so that the consumer can view the measured performance indicia and the approximate location of the measurement. Such indexing or placement of the removable face template (800) on the face (200) may also position the other indicia (840, 850, 860, 870) within 0.25 inches of the point on the face (200) where the associated CT or COR was measured.

In another embodiment the template-to-face alignment indicator (820) is a portion of a template perimeter (825) configured to match a portion of the face perimeter (210) so the removable face template (800) is precisely positioned on the face (200) and a portion of the center face indicia (830) is within 0.25 inches of the face center (250). Still further, a portion of the template perimeter (825) extends beyond the face perimeter (210) to form a template gripping region (827) that a human can easily grip to precisely align, or remove, the removable face template (800), as seen in FIG. 15. In one particular embodiment the removable face template (800) is a static cling vinyl, which in another embodiment is transparent. The removable face template (800) may be as simple as a face sticker.

In another embodiment the face (200) may have a permanent first face point indicator at the location of the first face point (300), such as the dot shown in FIG. 15, and a portion of the template-to-face alignment indicator (820), with a corresponding dot or opening, aligns with the first face point indicator so the removable face template (800) is precisely positioned on the face (200) and a portion of the first indicia (840) is within 0.25 inches of the first face point (300). Further embodiments may incorporate additional permanent face point indicator(s) on the face (200) and corresponding template-to-face alignment indicator (820) for additional face points.

Figure 17:
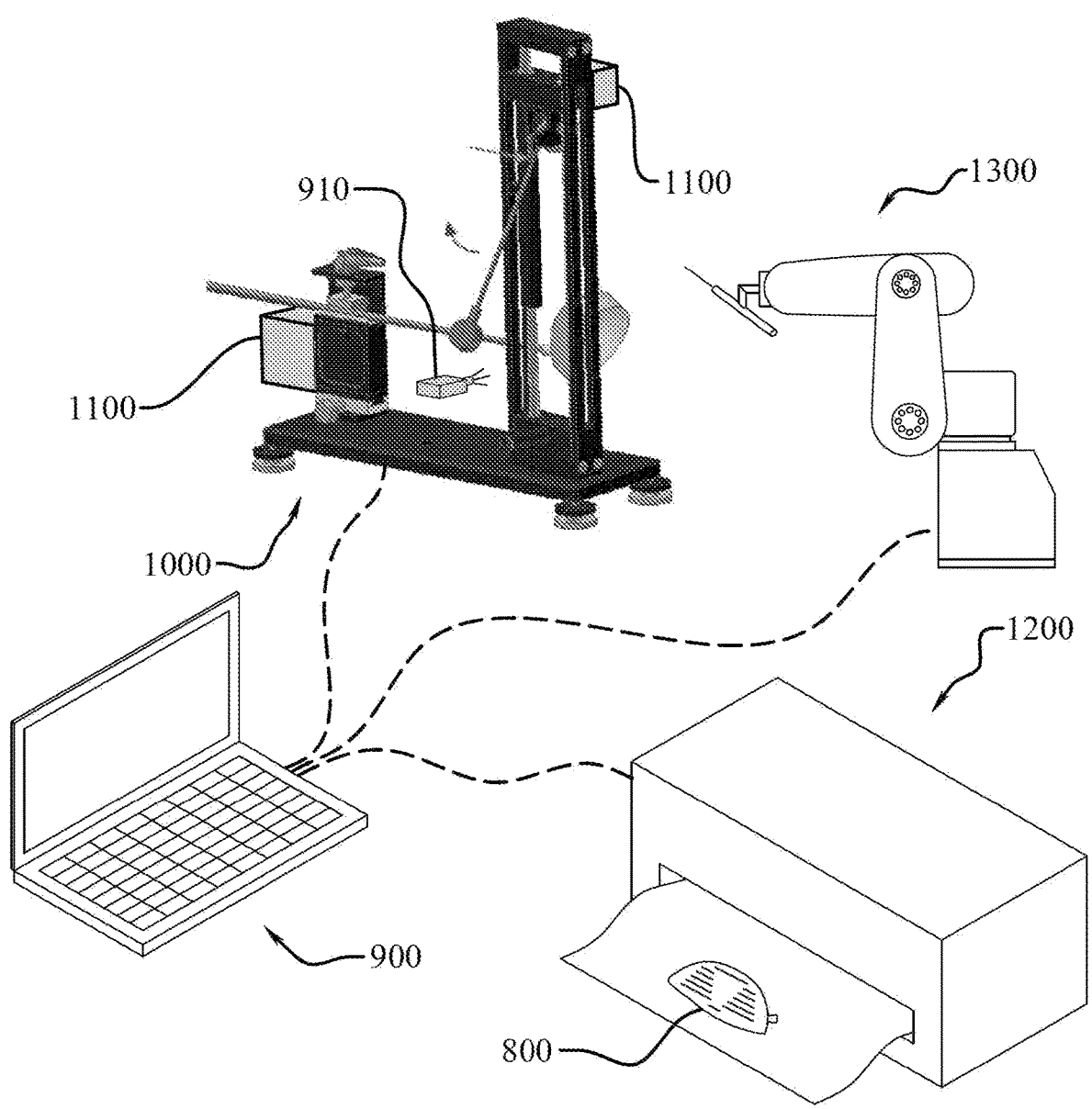
FIG. 17 shows a schematic view of several items used in a method of the present invention, not to scale.

In another embodiment the method of identifying a particular point on the face (200) of a golf club head (100), measuring a performance indicative characteristic of the face (200) at the point, and either permanently labeling the golf club head (100), or creating a unique face template (800), may be automated in a method of mapping a plurality of performance variables of the face (200) of a golf club head (100), schematically represented in FIG. 17. The method includes the steps of: A) identifying a face center (250) on the face (200) of the golf club head (100) and storing the coordinates of the face center (250) in a computer system (900); B) identifying a curvature profile of at least a portion of the face (200) of the golf club head (100) and storing the curvature profile in the computer system (900); C) computing a 3-dimensional face coordinate grid including at least a first face point (300) located on a face toe portion (260) of the golf club head (100), and a second face point (400) located on a face heel portion (270) of the golf club head (100), and storing the coordinates of the first face point (300) and the second face point (400) in the computer system (900); D) positioning the golf club head (100) or a measurement instrument (1000) via the computer system (900) to align the measurement instrument (1000) with the coordinates of the face center (250); E) activating the measurement instrument (1000) via the computer system (900) to determine a center face CT and storing the center face CT in the computer system (900); F) positioning the golf club head (100) or the measurement instrument (1000) via the computer system (900) to align the measurement instrument (1000) with the coordinates of the first face point (300); G) activating the measurement instrument (1000) via the computer system (900) to determine a first CT and storing the first CT in the computer system (900); H) positioning the golf club head (100) or the measurement instrument (1000) via the computer system (900) to align the measurement instrument (1000) with the coordinates of the second face point (400); and I) activating the measurement instrument (1000) via the computer system (900) to determine a second CT and storing the second CT in the computer system (900).

The step of identifying a face center (250) has been explained with reference to a USGA procedure using a template, however one skilled in the art will appreciate that the same face center (250) may be determined by the computer system (900) and at least one image of the golf club head (100), preferably a front elevation image looking at the face (200) or a full three-dimensional scanned image of the golf club head (100). In one particular embodiment specific to drivers, a three-dimensional scanned image of the golf club head (100) may be analyzed with the computer system (900) and a best fit approximation of the roll curvature may be determined for the face (200) based upon the location of all scanned points that are within 22 mm above and below the face center. Within a given vertical plane that is normal to the face (200), the top edge (214) is then identified in the scanned data as the lowermost point above the face center (250) at which the scanned data deviates by more than a threshold amount (e.g., 0.1 mm) from the best fit roll curvature, and the leading edge (212) is identified as the uppermost point below the face center (250) at which the scanned data deviates by more than the threshold amount from the best fit roll curvature. A similar procedure may be used by the computer system (900) to identify the face perimeter (210), to calculate the striking surface area (232), to determine the bounds of the upper face toe portion (262), the lower face toe portion (264), the upper face heel portion (272), the lower face heel portion (278), and/or to determine the linear face marking surface area (284).

Thus, in one embodiment the step of identifying the curvature profile of at least a portion of the face (200) includes the step of imaging at least a portion of the face with an imaging system (910) in communication with the computer system (100) and storing the face image data in the computer system (900). Alternatively, the step of identifying the curvature profile of at least a portion of the face (200) includes the step of retrieving face profile data from a predefined face profile file stored in the computer system (900). As one skilled in the art will appreciate, the face (200) of metal wood type golf club heads (100) generally have a bulge and a roll defining a face curvature. Further, it is not uncommon for golf club heads (100) to have multiple bulge and roll values across the face (200).

The computer system (900) uses the face image data when positioning the golf club head (100) or the measurement instrument (1000) via the computer system (900) to align the measurement instrument (1000) with the coordinates of the first face point (300). A positioning system (1100), seen in FIG. 17, may accept instructions from the computer system (900) to move the orient the golf club head (100), or it may move and orient the measurement instrument (1000), or a combination of both. Thus, in one embodiment the step of positioning the golf club head (100) or the measurement instrument (1000) via the computer system (900) to align the measurement instrument (1000) with the coordinates of the first face point (300), includes the step of adjusting the orientation of the golf club head (100) or the measurement instrument (1000) via the computer system (900) so the measurement instrument (1000) is measuring the first CT approximately perpendicular to the first face point (300). Similarly regarding the second face point (400). Here, the step of positioning the golf club head (100) or the measurement instrument (1000) via the computer system (900) to align the measurement instrument (1000) with the coordinates of the second face point (400), includes the step of adjusting the orientation of the golf club head (100) or the measurement instrument (1000) via the computer system (900) so the measurement instrument (1000) is measuring the second CT approximately perpendicular to the second face point (400). As the first face point (300) is on the face toe portion (260) and the second face point (400) is on the face heel portion (270), it is easy for one skilled in the art to appreciate how much the orientation must be adjusted to ensure that measurement of the CT is occurring at the desired face point in an approximately perpendicular orientation, as well as how time consuming such adjustments would be without an automated system.

Figure 18:
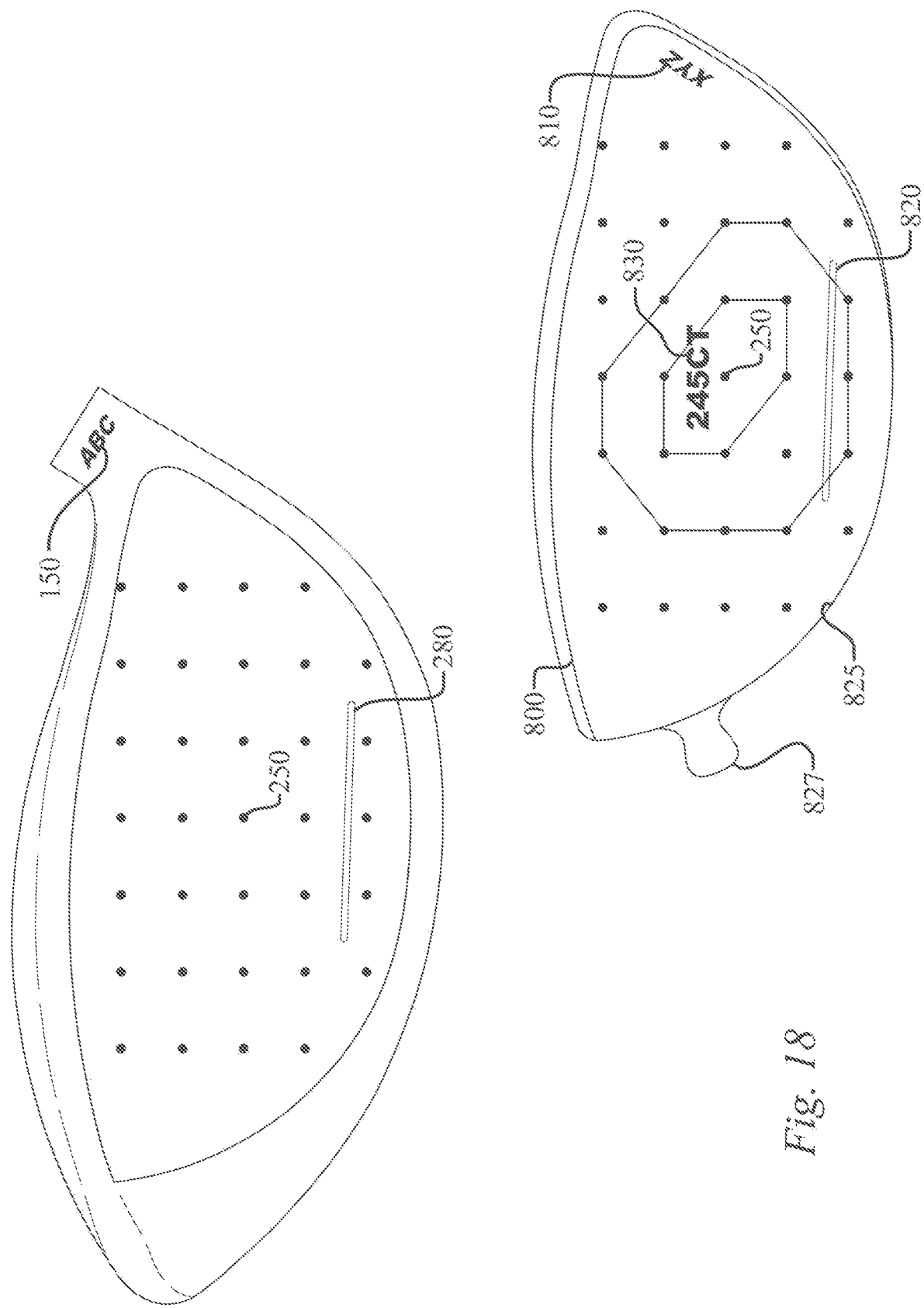
FIG. 18 shows a front elevation view of a golf club head of the present invention, not to scale.

As such, in one embodiment the method of mapping a plurality of performance variables of the face (200) of a golf club head (100) comprising the steps associated with identifying and measuring at least one point for every 1 square inch of face area. A further embodiment comprising the steps associated with identifying and measuring at least one point for every 0.75 square inch of face area, while an even further embodiment comprising the steps associated with identifying and measuring at least one point for every 0.5 square inch of face area. Thus, while the prior disclosure described embodiments having five or less face points, the automated system disclosed can carry out the steps necessary to map 10 or more points on the face (200), while some embodiments as seen in FIG. 18 may map in excess of 30 face points to provide the purchaser with a very unique map of the face performance.

In one embodiment the computer system (900) creates the mapping pattern for the face (200) based upon the face area, the shape of the face (200), and the desired number of face points. With the mapping pattern established the computer system (900) computes a 3-dimensional face coordinate grid including the coordinates for each face point in the mapping patter, and the computer system (900) stores the coordinates in the computer system (900). Next, the computer system positions the golf club head (100) or the measurement instrument (1000) to align the measurement instrument (1000) with the coordinates of an individual face point. Then, the computer system (900) activates the measurement instrument (1000) via the computer system (900) to determine a specific face point CT and stores this CT in the computer system (900). The process is then repeated for each desired face point. In yet a further embodiment the data gathered for each desired face point is analyzed by the computer system (900) and a measured CT performance map is created by the computer system (900). As previously mentioned, the measured CT performance map may be similar to a topographic map with contour lines, or regions of common color or finish, and may be in the form of permanent indicia on the golf club head (100) or indicia on a face template (800), as seen in FIG. 18. In one embodiment the computer system (900) identifies the face point with the highest measured CT. The computer system (900) then uses the measured CT values of the other face point to create a topographic map using measured CT values instead of elevations.

Alternative embodiments may include additional permanent indicia in the form of contour lines to allow a consumer to view how the measure CT varies across the face (200) of a particular golf club. Such additional permanent indicia contour lines may be shown in increments of 1 microsecond, 2 microseconds, 5 microseconds, or even 10 microseconds. In yet a further embodiment consists of variations of the face surface in lieu of a distinct a perimeter contour line, as described above, while transmitting the same information to the consumer regarding the actual measured CT, or CT profile, of a particular golf club head (100). Such permanent indicia surface variations may be achieved with a change in surface texture, brushing, polishing, gloss, and/or color. Another embodiment includes the step of creating an electronic face template with the computer system (900) and printing a removable face template (800) with a printer (1200) in communication with the computer system (900), as seen in FIG. 17.

A further embodiment includes the step of controlling a marking system (1300), schematically represented in FIG. 17 by a table top robotic arm system carrying a laser, with the computer system (1000) to create (i) a center face permanent indicia (252) indicative of the center face CT on the face (200) near the face center (250), (ii) a first permanent indicia (310) indicative of the first CT on the face (200) near the first face point (310), and (iii) a second permanent indicia (410) indicative of the second CT on the face (200) near the second face point (410). In one particular variation the marking system (1300) is a laser, and the computer system (1000) controls the movement and activation of the laser to create the center face permanent indicia (252), the first permanent indicia (310), and the second permanent indicia (410). An even further embodiment includes the step of having the computer system (1000) adjust the orientation of the laser at the first face point (310) so that a beam is approximately perpendicular to the face (200) at the first face point (310); and/or the step of having the computer system (1000) adjust the orientation of the laser at the second face point (410) so that the beam is approximately perpendicular to the face (200) at the second face point (410).

Another embodiment of the method includes the step of imaging a portion of the golf club head (100) to identify a permanent club identifier (150) on the golf club head (100), and storing the permanent club identifier (150) in the computer system (900). The computer system (900) then automatically creates the template identifier (810).

Another embodiment includes the step of creating an electronic face template with the computer system (900) and printing a removable face template (800) with a printer in communication with the computer system (900), wherein the removable face template (800) has a template identifier (810) related to a permanent club identifier (150) on the golf club head (100), and a template-to-face alignment indicator (820) corresponding to an aspect of the face (200) to align the removable face template (800) with a portion of the face (200), wherein the removable face template (800) includes a center face indicia (830) that is indicative of the center face CT, a first indicia (840) that is indicative of the first CT, a second indicia (850) that is indicative of the second CT, a third indicia (860) that is indicative of the third CT, and a fourth indicia (860) that is indicative of the fourth CT, and wherein the position of the center face indicia (830) on the removable face template (800) corresponds to location of the face center (250) on the golf club head (100) when the template-to-face alignment indicator (820) is positioned on the face (200) to cooperate with the corresponding aspect of the face (200), the position of the first indicia (840) corresponds to location of the first face point (300) when the template-to-face alignment indicator (820) is positioned on the face (200) to cooperate with the corresponding aspect of the face (200), the position of the second indicia (850) corresponds to location of the second face point (400) when the template-to-face alignment indicator (820) is positioned on the face (200) to cooperate with the corresponding aspect of the face (200), the position of the third indicia (850) corresponds to location of the third face point (500) when the template-to-face alignment indicator (820) is positioned on the face (200) to cooperate with the corresponding aspect of the face (200), and the position of the fourth indicia (840) corresponds to location of the fourth face point (600) when the template-to-face alignment indicator (820) is positioned on the face (200) to cooperate with the corresponding aspect of the face (200). In another embodiment the step of positioning the golf club head (100) or the measurement instrument (1000) via the computer system (900) to align the measurement instrument (1000) with the coordinates of the first face point (300), includes the step of adjusting the orientation of the golf club head (100) or the measurement instrument (1000) via the computer system (900) so the measurement instrument (1000) is measuring the first CT approximately perpendicular to the first face point (300); and the step of positioning the golf club head (100) or the measurement instrument (1000) via the computer system (900) to align the measurement instrument (1000) with the coordinates of the second face point (400), includes the step of adjusting the orientation of the golf club head (100) or the measurement instrument (1000) via the computer system (900) so the measurement instrument (1000) is measuring the second CT approximately perpendicular to the second face point (400); and the step of positioning the golf club head (100) or the measurement instrument (1000) via the computer system (900) to align the measurement instrument (1000) with the coordinates of the third face point (500), includes the step of adjusting the orientation of the golf club head (100) or the measurement instrument (1000) via the computer system (900) so the measurement instrument (1000) is measuring the third CT approximately perpendicular to the third face point (500), and the step of positioning the golf club head (100) or the measurement instrument (1000) via the computer system (900) to align the measurement instrument (1000) with the coordinates of the fourth face point (600), includes the step of adjusting the orientation of the golf club head (100) or the measurement instrument (1000) via the computer system (900) so the measurement instrument (1000) is measuring the fourth CT approximately perpendicular to the fourth face point (600).

Another embodiment includes the step of controlling a marking system (1300) with the computer system (1000) to create (i) a center face permanent indicia (252) indicative of the center face CT on the face (200) near the face center (250), (ii) a first permanent indicia (310) indicative of the first CT on the face (200) near the first face point (310), (iii) a second permanent indicia (410) indicative of the second CT on the face (200) near the second face point (410), (iv) a third permanent indicia (510) indicative of the third CT on the face (200) near the third face point (510), and (v) a fourth permanent indicia (610) indicative of the fourth CT on the face (200) near the fourth face point (610). In an even further variation, the marking system (1300) is a laser, and the computer system (1000) controls the movement and activation of the laser to create the center face permanent indicia (252), the first permanent indicia (310), the second permanent indicia (410), the third permanent indicia (510), and the fourth permanent indicia (610). Still further, the step of having the computer system (1000) may adjust the orientation of the laser at the first face point (310) so that a beam is approximately perpendicular to the face (200) at the first face point (310), approximately perpendicular to the face (200) at the second face point (410), approximately perpendicular to the face (200) at the third face point (510), and approximately perpendicular to the face (200) at the fourth face point (610).

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:
1. A wood-style golf club head comprising:
   a face having:
      a face center with a face center thickness;
      a first face point located on a face toe portion and higher than the face center, the first face point having a first face point face thickness;
      a second face point located on a face heel portion and lower than the face center, the second face point having a second face point face thickness;
      a third face point located on the face toe portion and lower than the face center, the third face point having a third face point face thickness;

a fourth face point located on a face heel portion and higher than the face center, the fourth face point having a fourth face point face thickness;

wherein the first face point face thickness is not equal to the face center thickness, the second face point face thickness is not equal to the face center thickness, the second face point face thickness is not equal the first face point face thickness, the third face point face thickness is not equal to the first face point face thickness, and the fourth face point face thickness is not equal to the second face point face thickness;

a plurality of linear face markings on the face and having a linear face marking CIELab L* value, and including at least one linear face marking higher than the face center and at least one linear face marking lower than the face center;

a face toe permanent indicia in the form of at least two letters located at least partially on a face toe portion of the face, the face toe permanent indicia having a face toe permanent indicia CIELab L* value;

wherein:
the face, outside areas of the plurality of linear face markings and the permanent indicia, has a face CIELab L* value;
a difference between the linear face marking CIELab L* value and the face CIELab L* value is at least 30; and
a difference between the face toe permanent indicia CIELab L* value and the face CIELab L* value is related to a volume and a loft of the golf club head by an equation $[\Delta L^*] \leq [(\text{volume})/100 \times (\text{loft})]$.

2. The wood-style golf club head of claim 1, wherein the golf club head includes:
(i) a bore having a center that defines a shaft axis which intersects with a horizontal ground plane to define an origin point and establish a vertical shaft axis plane; and
(ii) a center of gravity located:
  (i) vertically from the origin point a distance Ycg; and
  (ii) horizontally from the origin point a distance Xcg that parallel to the shaft axis plane and the ground plane;
  (iii) wherein the face has a face perimeter and a shortest distance along the face from the first face point to the face perimeter is less than the Xcg distance, a shortest distance along the face from the second face point to the face perimeter is less than the Xcg distance, a shortest distance along the face from the third face point to the face perimeter is less than the Xcg distance, a shortest distance along the face from the fourth face point to the face perimeter is less than the Xcg distance, and a shortest distance from one of the two letters of the face toe permanent indicia is less than 75% of the Xcg distance.

3. The wood-style golf club head of claim 2, wherein the difference between the face toe permanent indicia CIELab L* value and the face CIELab L* value is less than 25.

4. The wood-style golf club head of claim 3, wherein the difference between the face toe permanent indicia CIELab L* value and the face CIELab L* value is less than 10.

5. The wood-style golf club head of claim 2, wherein at least a portion of one of the plurality of linear face markings is below the face toe permanent indicia with a vertical separation distance of less than 0.25 inch.

6. The wood-style golf club head of claim 2, wherein at least a portion of one of the plurality of linear face markings is above the face toe permanent indicia with a vertical separation distance of less than 0.25 inch.

7. The wood-style golf club head of claim 2, wherein the shortest distance from one of the two letters of the face toe permanent indicia is less than 50% of the Xcg distance.

8. The wood-style golf club head of claim 2, wherein the face, outside areas of the plurality of linear face markings and the permanent indicia, has a chroma value of less than 1.

9. The wood-style golf club head of claim 8, wherein a portion of the face, outside areas of the plurality of linear face markings and the permanent indicia, has a milled face surface pattern.

10. The wood-style golf club head of claim 8, wherein a portion of the face, outside areas of the plurality of linear face markings and the permanent indicia, has a lasered face pattern.

11. The wood-style golf club head of claim 2, wherein the face has a center face permanent indicia in the form of a permanent center face indicator at the face center, and the center face permanent indicia has a center face indicia surface area, wherein the face toe permanent indicia has a face toe permanent indicia surface area, and the plurality of linear face markings have a total linear face marking surface area, and wherein a sum of the center face indicia surface area and the face toe permanent indicia surface area is at least 25% of the total linear face marking surface area.

12. The wood-style golf club head of claim 11, wherein the center face permanent indicia has a center face permanent indicia CIELab L* value, wherein a difference between the center face permanent indicia CIELab L* value and the face CIELab L* value is related to the volume and the loft by an equation $[\Delta L^*] \leq [(\text{volume})/100 \times (\text{loft})]$.

13. The wood-style golf club head of claim 12, wherein the center face indicia surface area is at least 15% of the total linear face marking surface area.

14. The wood-style golf club head of claim 13, wherein the center face indicia surface area is less than the total linear face marking surface area.

15. The wood-style golf club head of claim 12, wherein the permanent center face indicator is represented as crosshairs.

16. The wood-style golf club head of claim 12, wherein the permanent center face indicator is represented as a symbol.

17. The wood-style golf club head of claim 2, wherein at least a portion of the face has a face coating with a coating thickness of 0.3-15 microns, and the face toe permanent indicia is formed in the face coating with an indicia depth no greater than the coating thickness.

18. The wood-style golf club head of claim 2, wherein the face, outside the areas of the plurality of linear face markings and the permanent indicia, has a face surface roughness of 5-70 μin.

19. The wood-style golf club head of claim 18, wherein the face toe permanent indicia has a face toe permanent indicia surface roughness, and the toe face permanent indicia surface roughness of at least 10 μin greater than an adjacent face surface roughness.

20. The wood-style golf club head of claim 19, wherein the face toe permanent indicia surface roughness is at least twice the adjacent face surface roughness, and no more than fifteen times the adjacent face surface roughness, and a difference between the face toe permanent indicia surface roughness and the adjacent face surface roughness is related to the loft and a face area by an equation $\Delta SR \geq [60*(\text{face area})/(\text{loft})]$.

\* \* \* \* \*